United States Patent [19]

Evans et al.

[11] Patent Number: 4,785,399
[45] Date of Patent: Nov. 15, 1988

[54] SHAPING GEOMETRIC OBJECTS BY CUMULATIVE TRANSLATIONAL SWEEPS

[75] Inventors: Roger C. Evans, Yorktown Heights; George M. Koppelman, New York; Vadakkedathu T. Rajan, Briarcliff Manor, all of N.Y.

[73] Assignee: International Business Machines Corporation, Armonk, N.Y.

[21] Appl. No.: 21,388

[22] Filed: Mar. 3, 1987

[51] Int. Cl.[4] .............................................. G06F 1/00
[52] U.S. Cl. .................................. 364/300; 364/512; 364/900
[58] Field of Search .............. 364/200, 300, 900, 419, 364/512

[56] References Cited

U.S. PATENT DOCUMENTS

| | | | |
|---|---|---|---|
| 3,519,997 | 7/1970 | Bernhart et al. | 340/172.5 |
| 3,927,948 | 12/1975 | Cox et al. | 364/419 X |
| 4,212,009 | 7/1980 | Adleman et al. | 340/728 |
| 4,300,136 | 11/1981 | Tsuiki et al. | 340/747 |
| 4,454,507 | 6/1984 | Srinivasan et al. | 340/744 |
| 4,510,616 | 4/1985 | Lougheed et al. | 382/8 |
| 4,569,014 | 2/1986 | Kishi et al. | 364/191 |

FOREIGN PATENT DOCUMENTS 1494849 7/1966 France .

OTHER PUBLICATIONS

Koppelman, G. M., Wesley, M. A., "Oyster: A Study of Integrated Circuits as Three-Dimensional Structures," IBM Journal of Research and Development, 27(2) (1983), pp. 149–163.

Wesley, M. A., Lozano-Perez, T., Lieberman, L. T., Lavin, M. A. and Grossman, D. D., "A Geometric Modelling System for Automated Mechanical Assembly," IBM Journal of Res. & Develop., 24(1) (1980), pp. 64–74.

Rossignac, J. R., and Requicha, A. A. G., "Offsetting Operations in Solid Modelling," Computer Aided Geometric Design, 3 (1986), pp. 129–148, North Holland.

Rossignac, J. R., "Blending and Offsetting Solid Models," TM 54 Production Automation Project (also Ph.D. Dissertation), University of Rochester, Jun. 1985, pp. 1–100.

Farouki, R. T., "The Approximation of Non-Degenerate Offset Surfaces," Computer Aided Geometric Design 3 (1986), pp. 15–43, North Holland.

Farouki, R. T., "Exact Offset Procedures for Simple Solids," Computer Aided Geometric Design 2 (1985), pp. 257–279, North Holland.

(List continued on next page.)

*Primary Examiner*—Raulfe B. Zache
*Attorney, Agent, or Firm*—Carl C. Kling; Philip J. Feig

[57] ABSTRACT

Cumulative translational sweeps are used to shape geometric objects in a computer model, and they permit display of the resulting changes in shape in the object modelled, and control of processes involving the object modelled. If the geometric object is polyhedral, the cumulative translational sweeps, by creating additional facets, effect selective rounding along model edges and around model vertices. This permits computer modelling of the growth of layers, encompassing in addition to flat surface growth, growth with rounding around corners and over obstacles. Such growth occurs in the manufacture of semiconductors. Modelling a change in a solid structure in stages of growth (or shrinking) and of rounding, as might take place during processing of integrated circuits is achieved by controlled sweep sequences that sweep the structure a finite number of times in accordance with a rayset and stipulated parameters of shape, balance, convexity/concavity, degree of faceting, and memory limitation. The cumulative translational sweep (CTS) is applied in combination with Boolean operations to simulate growth and shrinking over the boundary regions of polyhedral models. By creating additional facets, it effects stipulated selective or global rounding effects along model edges and around model vertices. Such sweeps are examined in terms of Minkowski sums—of the geometric objects that are swept, with structuring geometric shapes that are convex polyhedron from the zonotope subclass of the mathematical family of objects known as polytopes.

19 Claims, 12 Drawing Sheets

OTHER PUBLICATIONS

Chazelle, B. "Convex Partitions of Polyhedra: A Lower Bound and Worst-Case Optimal Algorithm," Siam J. Comput. 13 (3) (1984) pp. 488–507.

Lozano-Perez, T. and Wesley, M. "An Algorithm for Planning Collision-Free Paths Among Polyhedral Obstacles," Comm. ACM., vol. 22, No. 10, 1979, pp. 560–570.

Korein, J. U., "A Geometric Investigation of Reach," ACM Distinguished Dissertation, MIT Press, 1985, pp. 1–50.

Lozano-Perez, T. "Spatial Planning: Configuration Space Approach," IEEE Transactions on Computers C-32 (2) (1983), pp. 108–120.

Dally, W. J., Donath, W., and Ling, D., "Fast Convolution Operation for Contact Verification in Integrated Circuits," IBM Technical Disclosure Bulletin, vol. 28, No. 12, May 1986, pp. 5588–5594.

Coexeter, H. S. M., "Regular Polytopes," Dover Publictions 1973, pp. 27–30.

Fedorov, E. S., "Elemente der Gestaltenlehre," Mineralogicheskoe obshchestvo Leningrad (2), 21 (1885), pp. 1–279.

Grunbaum, B., "Complex Polytopes," Interscience Publishers 1967, pp. 1–25.

McMullen, P., "On Zonotopes," Trans. Amer. Math. Soc., 159 (1971), pp. 91–109.

Serra, J., "Image Analysis and Mathematical Morphology," Academic Press, 1982, pp. 47–48.

Sternberg, Stanley R., "An Overview of Image Algebra and Related Architectures," in Integrated Technology for Parallel Image Processing, Academic Press, 1985, pp. 79–100.

Schneider, R. and Weil, Wolfgang, "Zonoids and Related Topics," in Convexity and Its Applications, edited by Peter Gruber and Jorg Wills, Birkhauser 1983, pp. 296–317.

Betke, U. and McMullen, P., "Estimating the Size of Convex Bodies from Projections," J. London Math. Soc. (2), 27 (1983), pp. 525–538.

Lyusternik, L. A., "Convex Figures and Polyhedra," Dover Publications, Inc. New York, pp. 91–92, 131–135.

Bolker, E. D., "A Class of Convex Bodies," Transactions of the American Mathematical Society, vol. 145, Nov. 1969, pp. 323–326, 342–345.

Klok, F. "Two Moving Coordinate Frames for Sweeping Along a 3D Trajectory," Delft University of Technology, 1985 Report 85-27, pp. 1–26.

SHAPING GEOMETRIC OBJECTS BY CUMULATIVE TRANSLATIONAL SWEEPS

BACKGROUND OF THE INVENTION

1. Field of the Invention

This invention relates to computer modelling for process control, and more particularly relates to computer modelling of the process of shaping a geometric object by controlled cumulative translational sweeps, according to a parameterized operational rayset, to provide a model of shaping changes to the object during the process.

2. Description of the Prior Art

The following publications and patents are representative of the prior art:

Publications

Koppelman, G. M., Wesley M.A., "OYSTER: A Study of Integrated Circuits as Three-Dimensional Structures," IBM Journal of Research and Development, 27(2) (1983), pp. 149-163, shows semiconductor fabrication sequences using polyhedral modelling systems.

Wesley, M. A., Lozano-Perez, T., Lieberman, L. T., Lavin, M. A. and Grossman, D. D., "A geometric modelling system for automated mechanical assembly," IBM Journal of Research and Development, 24(1) (1980), pp. 64-74, shows a technique for designing " . . . objects by combining positive and negative parameterized primitive volumes . . . represented internally as polyhedra."

Rossignac, J. R., and Requicha, A. A. G., "Offsetting Operations in Solid Modelling," Computer Aided Geometric Design, 3(1986), pp. 129-148, North Holland, shows how sequences of solid offsetting operations can be used to develop solid models having surface "blends" made through the generation of constant-radius "fillets" and "rounds."

Rossignac, J. R., "Blending and Offsetting Solid Models," TM 54 Production Automation Project (also Ph. D. Dissertation), University of Rochester, June 1985, shows shaping techniques including general offsetting techniques leading beyond the polyhedral domain.

Farouki, R. T., "The Approximation of Non-degenerate Offset Surfaces," Computer Aided Geometric Design 3 (1986) pp. 15-43, North Holland, shows shaping techniques including general offsetting techniques leading beyond the polyhedral domain.

Farouki, R. T., "Exact Offset Procedures for Simple Solids," Computer Aided Geometric Design 2 (1985), pp. 257-279, North Holland, shows polyhedral offsetting applied to convex polyhedra.

Chazelle, B "Convex Partitions of Polyhedra: A Lower Bound and Worst-Case Optimal Algorithm," SIAM J. Comput. 13 (3) (1984) pp. 488-507, a method for splitting general polyhedra into convex components that are separately shaped and reassembled.

Lozano-Perez, T. and Wesley, M. "An algorithm for planning collision-free paths among polyhedral obstacles," Comm. ACM, shows a collision avoidance algorithm for a polyhedral object moving among known polyhedral obstacles, using a calculated sweep, check for collisions, and proposed new path.

Korein, J. U. "A geometric Investigation of Reach," ACM Distinguished Dissertation, MIT Press, 1985, shows sweeping to computer the shape of various space regions.

Lozano-Perez, T. "Spatial Planning: Configurations Space Approach," IEEE Transactions on Computers C-32 (2) (1983), shows the use of unions of convex polyhedra in computing collision-free robotic motions.

Dally, W. J., Donath, W., and Ling, D., "Fast Convolution Operation for Contact Verification in Integrated Circuits" IBM Technical Disclosure Bulletin Vol. 28 No. 12, May 1986, shows convolution techniques, using convex polygons, for contact verification in integrated circuits.

Coxeter, H. S. M. "Regular Polytopes," Dover Publications 1973, pp. 27-30.

Fedorov, E. S., "Elemente der Gestaltenlehre," Mineralogicheskoe obshchestvo Leningrad (2), 21 (1885), pp. 1-279, is an early text in the mathematics.

Grunbaum, B. "Convex Polytopes," Interscience Publishers 1967, explains polytopes.

McMullen, P., "On Zonotopes," trans. Amer. Math. Soc., 159 (1971), pp. 91-109, explains zonotopes.

Serra, J., "Image Analysis and Mathematical Morphology," Academic Press 1982, pp. 47-48, shows the algebraic properties of dilation and erosion operations on neighborhoods as discrete domains such as the pixels in an image. Some sequences of these operations are expressible as Minkowski sums. Erosion, for example, need not be a simple operation such as the sandblasting of a film of dirt, but rather may be made by erosion with a convex structuring element such as a regular hexagon; that is, by taking out bites that are shaped like regular hexagons. Serra states that he can " . . . erode a 3-D set X . . . with respect to a polyhedron B, by combining 2-D erosions." Serra does not suggest using iterated sweep sequences for growing, shrinking and rounding polyhedrons. Serra develops the algebraic properties of "dilation" and "erosion" —shaping operations based on neighborhood rules applicable over discrete domains, such as the arrangement of pixels in an image.

Sternberg, Stanley R., "An Overview of Image Algebra and Related Architectures," in "Integrated Technology for Parallel Image Processing," Academic Press," 1985, pp. 79-100.

Schneider, R. and Weil. Woflgang "Zonoids and Related Topics," in "Convexity and Its Applications," edited by Peter Gruber and Jorg Wills, Birkhauser 1983, pp. 296-317, explains zonoids.

Betke, U. and McMullen, P., "Estimating the size of convex bodies from projections," J. London Math. Soc. (2), 27 (1983), pp. 525-538. shows the use of zonotopes to approximate spheres.

Foreign Patents

France No. 1,494,849, PROCESS FOR GENERATION OF A CURVE FOR MACHINES TO TRACE OR TO USE, 1966, shows a computer technique to develop curves by combining segments.

U.S. Patents

U.S. Pat. No. 3,519,997, Bernhart et al, PLANAR ILLUSTRATION METHOD AND APPARATUS, 1970, shows computer techniques for making 2-D graphics of 3D objects, converting Cartesian coordinates and projections in separate subroutines.

U.S. Pat. No. 4,212,009, Adleman et al, SMOOTHING A RASTER DISPLAY, 1980, shows sweeping a geometric shape by sampling, growing and eroding.

U.S. Pat. No. 4,300,136, Tsuiki et al, DISPLAY PATTERN PREPARING SYSTEM, 1981, shows a technique for assembling a display from segments stored as fixed patterns and reference positions.

U.S. Pat. No. 4,454,507, Srinavasan et al, REAL-TIME CURSOR GENERATOR, 1984, shows synthesis of a cursor on a display by specifying start and stop and number of raster lines.

U.S. Pat. No. 4,510,616, Lougheed et al, DESIGN RULE CHECKING USING SERIAL NEIGHBORHOOD PROCESSORS, shows the use of an array processor to examine 3×3 neighborhood segments of an image for compliance to design rules for laying out integrated circuits.

U.S. Pat. No. 4,569,014, Kishi et al, METHOD OF CREATING A CURVED SURFACE, 1986, shows development of a curved surface in sections from section data by developing perpendicular curves for machining control.

"Shaping" is a generic term in geometric modelling, having many senses such as growing, shrinking, rounding, filleting, faceting, blending and smoothing. It is encountered in such applications as: growing and shrinking to solve the collision-avoidance problem; growing and shrinking for the generation of blends; sweeping to compute the shape of various space regions; and offsetting as a means of defining mechanical tolerance.

Sweeping, as a geometric modelling tool, refers in its broad sense to the tracking of a body's motion in space. Most modellers can compute the track or sweptspace of a moving body which does not tumble, i.e., which has only translational freedom; this is the region of space that the moving body has passed through, or, quite informally, its "ghost." Some modellers can approximate tumbling motions (rotational freedom) as well.

SUMMARY OF THE INVENTION

This patent specification describes computer modelling of the process for shaping a polyhedral model.

This invention applies a sweep of the sweptspace of the previous sweep, cumulatively, effecting motion in not only the body but also in its ghost. If the ghost is deemed to be carried along with the body's motion and so to spawn its own ghost of a ghost (and so on, and so forth, . . . ), then there is a much larger sweptspace than than is usually conceived—one that we call cumulative to contrast it with the familiar tubular sweptspace. Cumulative sweeping without tumbling serves our shaping needs; we call such an operation a cumulative translational sweep or CTS. We will interpret motion curves as prescriptions for CTS shaping operations that may be performed upon an input body, interpreting sweptspaces as shaped output bodies.

The CTS method relates to a general offsetting operation known as Minkowski summation—and also as set convolution—that shapes a set of points by adding (vector summing) to each of them, in all possible pairings, each of the points of another selected shaping body (which we call offsetter or shaper). The effect of CTS prescriptions is to develop around any input polyhedron a polyhedral sweptspace which is the Minkowski sum of the input with a shaping polyhedron from the zonotope subfamily of the polytope family of polyhedrons.

As mentioned above in connection with the prior art, modelling systems used sweeping as a well known tool for developing a sweptspace. Sweeping, as a geometric modelling tool, refers in its broad sense to the tracking of a body's motion in space. Most modellers can compute the track or sweptspace of a moving body which does not tumble, i.e., which has only translational freedom; this is the region of space that the moving body has passed through, or, quite informally, its "ghost". Some modellers, such as the Geometric Design Processor referred to in Wesley, et al. above (GDP) which is the modeller supporting OYSTER, can approximate tumbling motions (rotational freedom) as well. No modellers we know of construe a sweeping operation as effecting motion in not only the body but also in its ghost; however, if the ghost is deemed to be carried along with the body's motion and so to spawn its own ghost of a ghost (and so on, and so forth, . . . ) there there is effected a much larger sweptspace than than is usually conceived—one that we call cumulative to contrast it with the familiar tubular sweptspace. Cumulative sweeping without tumbling serves our shaping needs; as noted above, we call such an operation a cumulative translational sweep or CTS. We will interpret motion curves as prescriptions for CTS shaping operations that may be performed upon an input body, interpreting sweptspaces as shaped output bodies.

The object of the invention is to provide a new method for effectively and easily shaping computer models of geometric objects undergoing process dynamics.

A feature of the invention is the technique of carrying out cumulative sweeps to provide shaping to the input polyhedral model.

Another feature of the invention is to provide for entry of parameters including scale, balance, convexity/concavity (CMODE), degree of faceting, and memory limitation.

Another feature of the invention is to increase overall economy of computer usage by combining colinear rays.

Another feature of the invention is to increase overall economy of computer usage by selectively reversing the ray direction if the direction-of-sweep facecount is greater than the contra-sweep-facecount, and performing a translation operation to correct for the translation error induced by the ray reversal.

A feature of the invention is a menu prompted computer assist to the user, in preparation of the parameterized operational rayset which controls the operation, by collapsing a selected zonotope to determine the rayset.

An advantage of the invention is that complicated shaping phenomena may be modelled in terms of swells, for useful display or for direct use in controlling the shaping process tool.

The foregoing and other objects, features and advantages of the invention will be apparent from the more particular description of the preferred embodiments of the invention, as illustrated in the accompanying drawings.

BRIEF DESCRIPTION OF THE DRAWINGS

FIGS. 1a, 1b, 1c and 1d illustrate the generating of an octagonal from a square prism, in which FIG. 1a illustrates an input square prism and two-segment sweep curve;

FIG. 1b illustrates a sweeping input along first curve segment;

FIG. 1c illustrates a sweeping cumulated result along final curve segment, and

FIG. 1d is a representation of conceptualizing the result as a Minkowski sum of the input prism with a parallelogram swell.

FIGS. 3a and 3b illustrate a planar rounding of an L-shaped polygon showing swells and offset lines, in which FIG. 3a illustrates rounding achieved by four rays (octagonal swell) and FIG. 3b illustrates rounding achieved by eight rays (16-sided swell).

FIGS. 4a, 4b and 4c illustrate growing and shrinking of a polygonal prism, in which FIG. 4a illustrates growth by a relative amount taken as 2—rounds convex corners;

FIG. 4b illustrates shrinking back by relative amount of 1—rounds concave corners, and FIG. 4c illustrates shrinking back the rest of the way—achieves a fill.

FIGS. 5a and 5b illustrate a four-rayed swell used for single faceting, in which FIG. 5a illustrates the orientation of the four rays, and FIG. 5b illustrates the generated swell, a rhombic dodecahedron, creates one new facet around edges in the x, y, or z directions.

FIGS. 7a and 7b illustrate dodecahedron shaping of a lattice of cubes, in which

FIG. 7a is an input lattice, and

FIG. 7b is a shaped output lattice.

FIGS. 9a, 9b and 9c illustrate varied layering dependent upon hangpoint location, in which FIG. 9a illustrates an underlying rectangular slab;

FIG. 9b illustrates a balanced layer determined by a balanced swell—having hangpoint at the center of symmetry, and FIG. 9c illustrates rising layer determined by a "climber"—swell having hangpoint below the center of symmetry.

FIGS. 10a, 10b, 10c and 10d illustrate deposition steps performed by the OYSTER modelling system, in which FIG. 10a illustrates a silicon device with several layers;

FIG. 10b illustrates a composite union of device layers;

FIG. 10c illustrates a layer grown by orthogonal 3 element rayset, and

FIG. 10d illustrates a grown layer of FIG. 10c shown in place conforming to previous layers.

FIGS. 12a and 12b illustrate deposition steps performed by OYSTER with edge faceting, in which FIG. 12a illustrates deposited layers with 1 edge facet and rounded masks, and FIG. 12b illustrates new blanket deposition with 2 edge facets.

DESCRIPTION OF A PREFERRED EMBODIMENT

Figure 1A:
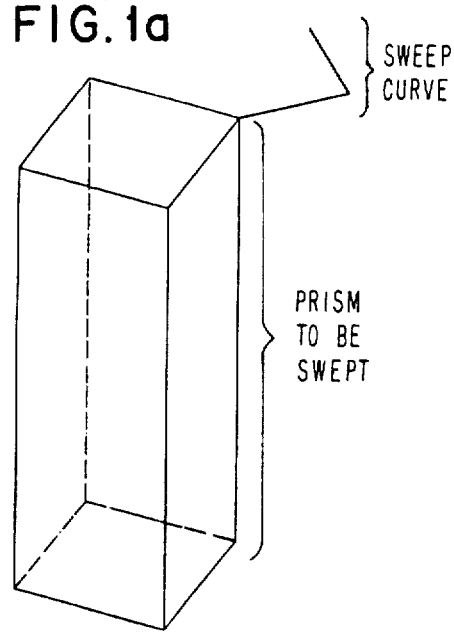
Figure 1C:
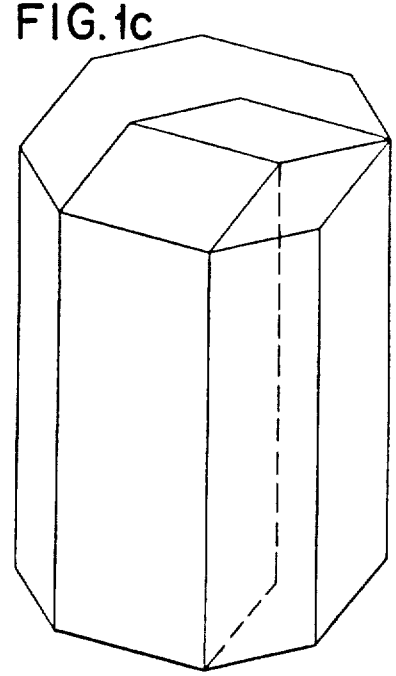
Figure 1B:
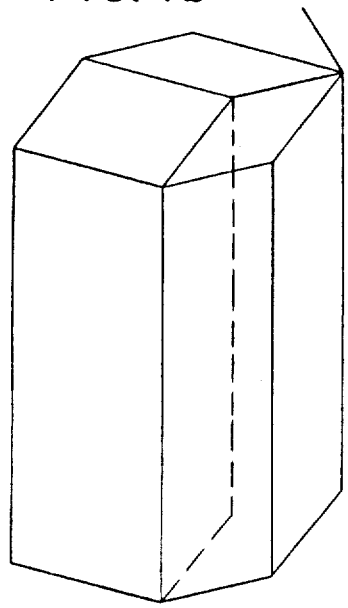

FIGS. 1–13 are demonstrative of the theory and mathematics involved in carrying out shaping operations on geometric models using controlled cumulative translational sweep (CTS) mechanism according to rayset and parameter stipulations of shape, balance, convexity/concavity (CMODE), degree of faceting and memory limitation.

The controlled cumulative translational sweep (CTS) is a technique for modelling the shaping of geometric objects. It may be applied, in combination with Boolean operations, to simulate growth and shrinking over the boundary regions of polyhedral models, and thus to control such growth and shrinking. By creating additional facets, it may be used to achieve selective and global rounding effects along model edges and around model vertices. Sweeps are examined in terms of a conceptual framework that describes their effects as Minkowski sums—of the polyhedra to be swept, with convex polyhedra from the class of mathematical objects known as zonotopes. The CTS system may be used for the simulation or control of semiconductor wafer fabrication, or for the simulation or control of icing on aircraft lifting or control surfaces, or for many other uses.

The mathematical terminology may not be familiar to all. Therefore, the theory and definitions are explained first, in the context of FIGS. 1–13, followed by a practical general statement in the context of FIG. 14.

The theory and definitions include the following headings:
SWEEP TYPES IN GENERAL
SWEEP TYPES IN THE OYSTER MODELLING SYSTEM
SWELLS AS SHAPING TOOLS
PROPERTIES OF RAY-BASED SWELLS
OYSTER CTS APPLICATIONS
CTS FOR GENERAL CURVES The general statement of the invention includes the following headings:
OPERATION OF THE CTS SYSTEM
STIPULATING RAYSET AND PARAMETERS Those who have great familiarity with the mathematics of computer modelling of geometric objects may wish to scan the theory sections and FIGS. 1–13 quickly, then read the practical general statement of the invention in the context of sections OPERATION OF THE CTS SYSTEM and STIPULATING RAYSET AND FACTORS, together with FIG. 14.

SWEEP TYPES IN GENERAL

A sweep is generally defined as any function, S, which maps a time t (of some parameter interval), a motion F(t), and a body B, to a sweptspace, S(F,t,B), that depends on both B and its motion history. To avoid encumbering notation, we will often suppress explicit reference to F when referring to the sweptspace and use S(t,B) as its designator.

Important uses of the term "sweep" (within the topic of generalized cylinders) admit motions, F, that involve scaling. But, for our purposes, F is disallowed such freedom and is constrained to be a rigid motion. It is taken as a time-parameterized frame transformation having translation vector f(t) as its translational component and rotation matrix M(t) as its rotational component. It associates with any point, b, a trajectory curve, f(t)+M(t)b. We assume that M(0) is the identity frame and that both f and M are continuous and piecewise differentiable.

Various sweep types are definable in terms of motion F and the rules that determine sweptspace membership. After making some broad distinctions on these bases, we will partition all rigid motion sweeps as either tubular or cumulative.

The trajectory, or tube, of B under sweep S is the union over all trajectory curves of points in B:

$$\text{tube}(S(F,t,B)) = \{f(\alpha) + M(\alpha)b: b \in B, 0 \leq \alpha \leq t\} = \cup \{F(\alpha)B: \alpha \in [0,t]\}.$$

This coincides with the tubelike space region that accommodates B's passage.

If sweptspace S(F,t,B) coincides with tube(S(F,t,B)), we call both S and the sweptspace tubular. Points in such a sweptspace clearly originate in B, in the sense that the tube is the union over all b-trajectories, b∈B.

The sweep curve is the translation curve, f; it is identifiable as the trajectory, or tube, of {0}—i.e., as the image set, f([0,t]), of [0,t]. A related subset of the sweptspace is the set S(t,{0}), or, by understanding, S(t,0); we call this set the swell. It is the swept image of singleton set, {0}, and for a tubular sweep it agrees with the sweep curve, but for cumulative sweeps (below) it is more extensive.

S is a translational sweep if M(t)=M(0)=the identity matrix; a rotational sweep if f(t)=f(0); and a mixed sweep if both M and f vary. If S is translational and tubular, then its sweptspace is the Minkowski sum, $S(t,B) = f([0,t]) + B = S(t,0) + B =$ swell+B; in fact, this decomposition applies to all translational sweeps, even non-tubular ones (below).

We describe sweep S as cumulative, and say it has a memory, if the sweptspace at any time is more extensive than the corresponding tube. This will be made exact by membership rules to be developed; informally, it means that points may enter a time-t sweptspace not only along point trajectories that have originated in B but also along point trajectories that have originated in earlier sweptspaces. For example, a point x belonging to S(F,t₁,B) may be permitted to spawn member $x' = F(t_2)F(t_1)^{-1}x$ of a later sweptspace, S(F,t₂,B). It is possible to place time limits in such origination rules in a manner that gives exact sense to the notion of a memory of specified duration; we return to this matter in our final section.

SWEEP TYPES IN THE OYSTER MODELLING SYSTEM

The preceding indicates that a very broad study of sweeps entails consideration of rotational, translational, and mixed sweep types, and of sweptspaces which are either tubular or cumulative and which, if cumulative, may have varying durations of memory. For the needs of the OYSTER modelling system, the focus is narrower.

An available modelling system, the GDP modeller, has an algorithm that creates a polyhedral approximation, under tubular mixed sweep, for the tube of a polyhedral body. By restriction, this algorithm makes available a precise representation for the polyhedral sweptspace that results from the tubular translational sweep of a polyhedron along a single line-segment sweep curve; and by iterating the latter process along finitely many line segments of a piecewise linear sweep curve, taking the output sweptspace from each stage (line segment) as the input body to the next, we achieve the special CTS used in OYSTER simulations.

An example is given by the FIGS. 1a, 1b, 1c and 1d sequence, which shows the generation of an octagonal from a square prism. In FIG. 1(a), the sweep curve is seen as a simple two-segment curve in proximity to the input prism; the first curve segment prescribes a tubular sweep that develops the FIG. 1(b) sweptspace, shown enclosing the original prism; the second segment then determines the output prism, FIG. 1(c), as a sweep of the former result. In such a manner, by iterating the tubular translational sweep (TTS), one achieves a single CTS.

Figure 1D:
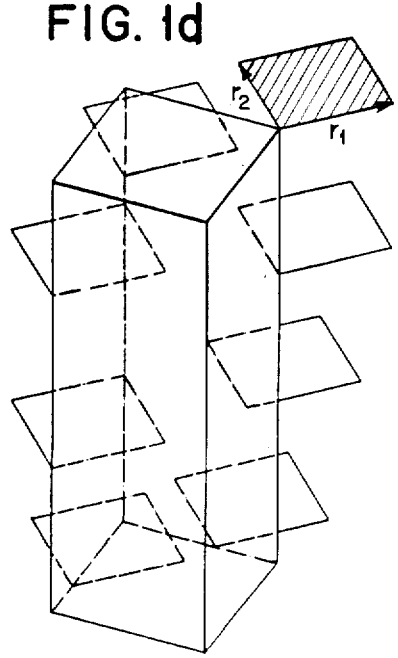

FIG. 1(d) indicates another way of conceptualizing the result. It shows the rays of the sweep, i.e., the separate sweep curve segments treated (and stored by OYSTER) as vectors, and the swell—in this case a shaded parallelogram identifiable with the effect of the sweep upon a single point. The figure suggests how the output prism derives from the Minkowski sum of the swell and input prism—informally, by sliding the swell around the boundary of the input prism while maintaining the swell's orientation and (with respect to the swell) the point of coincidence.

To clearly understand the CTS as a Minkowsky sum, consider the rays of the sweep to be given by vectors $r_1, \ldots, r_n$ ($1 \leq n \leq N$); that is, suppose the time parameter values associated with endpoints of the linear segments of f are $0 = t_0 \leq t_1 \leq \ldots \leq t_N$, and define $r_n \equiv f(t_n) - f(t_{n-1})$. Then, retaining the distinctions based on index, call set $R = \{r_1, \ldots, r_N\}$, the rayset of the sweep. The first ray then prescribes a sweep that creates sweptspace $$S(t_1, B) = S_{\{r_1\}}(B) = \{ar_1 + b: 0 \leq a \leq 1, b \in B\} = S_{\{r_1\}}(0) + B.$$

And, if f has more than one linear segment, a second ray iterates the process, developing $$S(t_2, B) = S_{\{r_1, r_2\}}(B) = S_{\{r_2\}}(0) + S_{\{r_1\}}(0) + B.$$

Continuing in this manner it is apparent that the final CTS sweptspace is $$S(t_N, B) = S_{\{r_1, \ldots, r_N\}}(B) = S_R(B) = S_{\{r_1\}}(0) + \ldots + S_{\{r_N\}}(0) + B = S_R(0) + B.$$

Observe of this CTS that swell $S(t_N, 0)$ has been given a new denotation, $S_R(0)$; we abbreviate this to $S_R$; and if R has only one ray, r, we abbreviate further still, to $\bar{r}$, since the swell is then the line segment given by $\bar{r} = \{ar: 0 \leq a \leq 1\}$.

As indicated, one may express sweptspace $S(t_N, B)$ as a sum which separates the contributions of the swell from those of the body—as $S_R(B) = S_R + B$. This extends an observation made earlier about the TTS to one that applies to a ray-based CTS; it is true of every translational sweep, S, that S(t,B)=S(t,0)+B., and one may study translational shaping processes—in disregard of the bodies to which they may be applied—by examining the shape of the swells that represent their effects.

Although swell $S_R$ was introduced with regard to an order of rays reflecting the order of line segments along sweep curve f, it is identified with the commutative set sum, $S_R = \bar{r}_1 + \ldots + \bar{r}_N$, and thus is order independent. It may be associated with any sweep curve derived from f by permuting the order of its linear segments; when computing sweptspace $S_R(B)$, we are free to choose that permutation of rays that will minimize cost.

The preceding exhibits swells as Minkowski sums involving finitely many line segments. Such sets are known in mathematics as zonotopes and limits of zonotopes sequences are called zonoids.

A polytope is the convex hull of a finite set of points. An alternative definition of zonotope that de-emphasizes its line basis is that it is a centrally symmetric polytope having centrally symmetric facets of every order, where a set is centrally symmetric, or centered, if it reflects through one of its own points onto itself, in this exact sense: X is centered at c∈X if p∈X implies segment pp' X, where p'≡2c−p, the reflection of p through c. In other words—and this is a characterization we later employ—X is centered at c iff for every p∈X and α∈[0,2], p+α(c−p)∈X.

Starting with a rayset, one may produce the zonotope which is its associated swell by applying the rayset, as a CTS prescription, to the origin. To go in the reverse direction, from an initial zonotope to a rayset which generates it, one may determine rays in this manner: call the zonotope's edges equivalent if they are parallel; let one ray (directed either way, by choice) represent each such equivalence class; the rayset so determined generates a translationally congruent zonotope (its location being influenced by the direction choices made—see discussion of ray reversal below).

SWELLS AS SHAPING TOOLS

Notation $S_R$ and terms such as "swell" call attention to the underlying rays and the growth dynamic that may be associated with zonotopes. We now return to that focus—natural to the study of sweeping as a growth process.

When point x is subjected to the CTS determined by rayset R is "swells" into zonotope $x + S_R$, and thus into swell $S_R$ if x is 0. This image set may be of surprising beauty. An example is the 56-faced swell shown in FIG. 2. Based upon eight rays, this shaper has been used in some OYSTER applications. In the instant case, the number of faces developing from N (≦3) rays in 3D is N(N−1)—provided no three of the rays are linearly dependent.

Figure 3A:
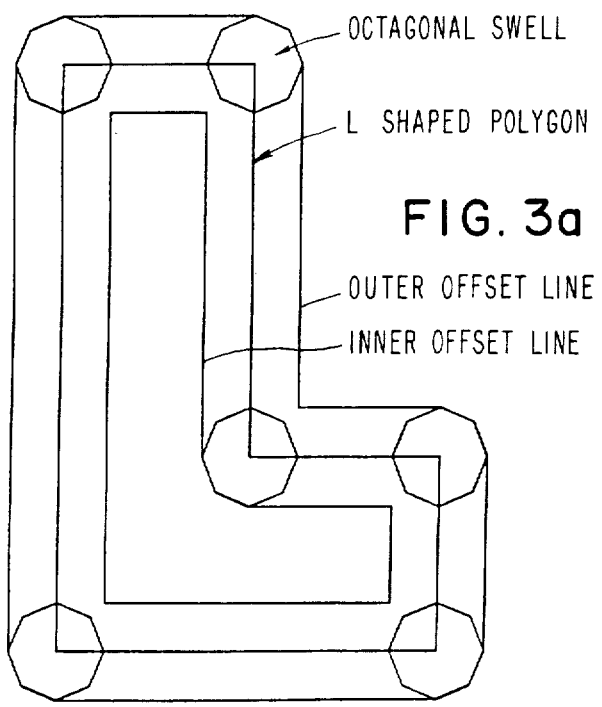
Figure 3B:
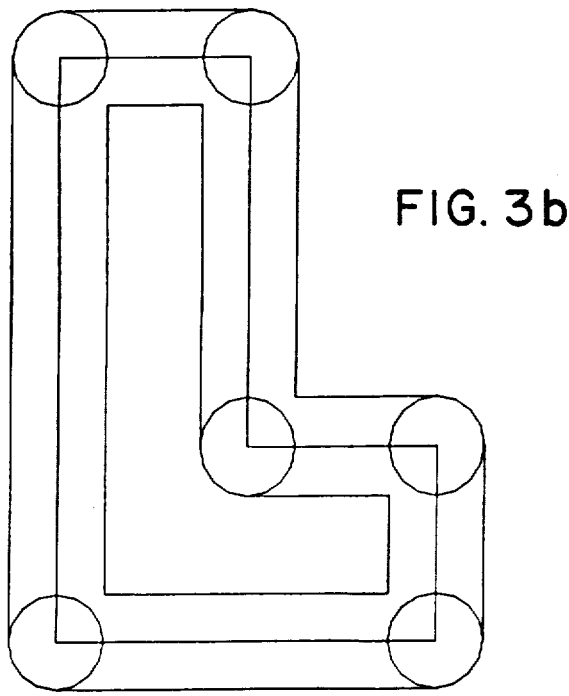

FIGS. 3a and 3b illustrate CTS rounding of an L-shaped polygon by two swells which approximate a circle, first roughly and then more accurately. A four element planar rayset develops the octagonal swell shown in FIG. 3(a), and an eight element one develops the sixteen side polygonal swell FIG. 3(b). The results show that the L develops a cover, $S_R(L)$, that has new edges around each original convex vertex—a simple approximation to rounding. The figure also illustrates the relations between swells as shapers and the grown or shrunken bodies that CTS creates. Output sweptspaces are shown in relation to the swells, in a manner that clarifies the Minkowski summation that is (conceptually) involved; swells seem to have acted upon input polygon L by sliding around its boundary, σL, and displacing it into a new position—determined with respect to the original by the swell's own shape.

That a sweptspace, $S_R(L)$, is describable in terms of activity along boundary σL is evident from the observation that points of the interior, L°, cannot be swept into new territory without first crossing the frontier; to decide what new territory is to be annexed, it suffices to follow the frontier crossing points, i.e., the points of σL. This observation is formally derivable as an argument parallel to one that shows that $E(d,L) \equiv L° \cup E(d, \sigma L)$—where E(d,B) denotes, for a space with metric ρ, the distance-d enlargement of non-empty set B, or set $$\{\text{points within } d \text{ of } L\} \equiv \bigcup_{b \in B} \{x: \rho(x,b) \leq d\};$$

a slight shading of the the meaning of "within d of" converts that argument into one which establishes that $S_R(L) = L° \cup S_R(\sigma L)$.

These boundary observations suggest that CTS shaping techniques are best suited for use in those geometric modellers that utilize boundary representations.

We complete the discussion concerning L's boundary by noting that $S_R(\sigma L)$ is the tube of another sweep, namely the tubular translational sweep that takes σL as its sweep curve and $S_R$ as the body to be swept; from one viewpoint, R contains a prescription for sweeping L, but from another, σL contains a prescription for sweeping $S_R$ (NC researchers may think of σL as control path and $S_R$ as zonotope-shaped cutting tool). In what follows, when referring to "the tube" we shall mean the tube associated with this (dual) "motion" of the swell, not the tube of the original sweep.

FIG. 3a and FIG. 3b, inward offset lines delineate the inward extent of the tube; outward offset lines delineate the outward extent. As the swell passes through the tube and takes a turn at a convex corner (with respect to L), it impresses a partial image of itself in the outward line, a faceted relic of its passage; along the inward offset line (growth line for L complement) the relics are left near L's concave corners; across the tube from a faceted impression the opposite tube boundary retains L's angularity, a hint that on one side the tube has completely swallowed the swell.

The point of the swell which always maintains coincidence with σL we call the hangpoint. In terms of the set summation involved, it is of course the origin, 0, but giving it this special name is an invitation to see it in terms of it relative position, at a particular boundary or interior location within the swell, and to consider this relative location as pertinent to the shape of that portion of sweptspace that lies outside the body (the incremental deposited layer). To say that hangpoint and center of symmetry agree is to say that the sweep curve is closed, or that the rays sum to 0.

In FIG. 3a and FIG. 3b, the simulation of rounding at the corners of L improves as the the number of rays is increased. By taking sufficiently many sufficiently small rays, a planar swell may be made to approach arbitrarily closely to a circular disk. Thus, in the xy plane, if N rays are defined by letting $r_n$ be the ray of length $l_N$ at angle $(2n-1)\pi/2N$ (counterclockwise from the +x axis), where $l_N \equiv 2 \sin^{-1}(\pi/2N)$, then the swell is a 2N-gon inscribing the unit circle and inscribed by a circle of radius cos $(\pi/2N)$. The aspect ratio for the Nth such swell (ratio of its maximum to minimum width) is $1/\cos(\pi/2N) \to 1$ (with value 1.04, for example, when $N=6$), which proves convergence to a disk.

Regions corresponding to the following operational definitions may also be identified in FIG. 3a and FIG. 3b:

grow $L \equiv gr_R(L) \equiv S_R(L)$.

shrink $L \equiv shr_R(L) \equiv$ complement($gr_R$(complement L)), achieving the Boolean complement of the grown Boolean complement of L.

layer $L \equiv lay_R(L) \equiv gr_R(L) - L$, where the minus sign denotes Boonlean difference. We also call this result the deposit, or the incremental growth, gri(L).

erase $L \equiv er_R(L) \equiv L - shr(L)$. We also call this result the withdrawal, or the incremental shrinkage, shri(L).

Sweeps remove material layers as well as they deposit them, since Boonlean complementation introduces a pervasive duality. What what to body B is growth is to its complement shrinkage, and what to body B is convex is to its complement concave. Sequences which combine growth and complementation under varying rayset control serve many special needs; we indicate two such: $shr_R(gr_R(*))$ achieves fills along any edges where two faces meet concavely (by duality, the $gr_R(shr_R(*))$ combination "sands off" along "sharp" edges where faces meet convexly); and, in order to layer B with final thickness characteristics determined by rayset R and in a manner that that rounds near both its concave and convex edges, one may grow B under control of rayset 2R and shrink back under control of rayset R, i.e., may apply $shr_R(gr_{2R}(*))$—a combination with its own useful dual.

Figure 4A:
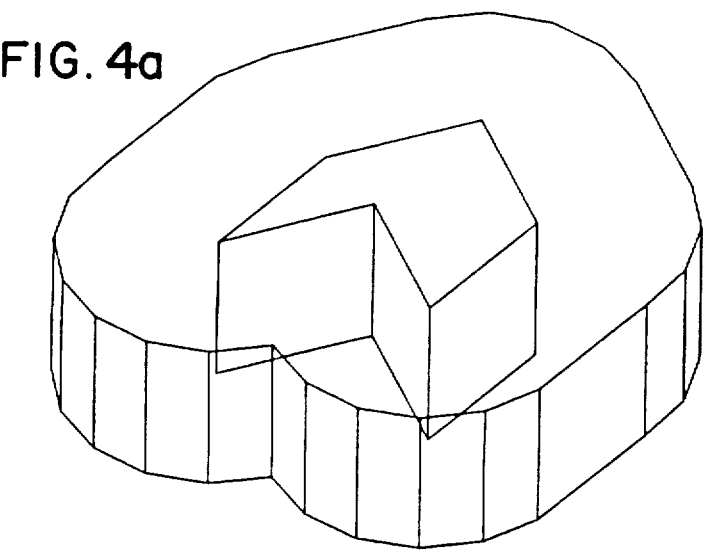
Figure 4B:
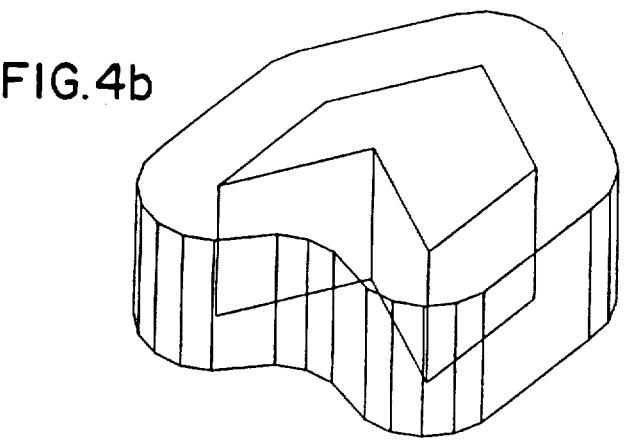
Figure 4C:
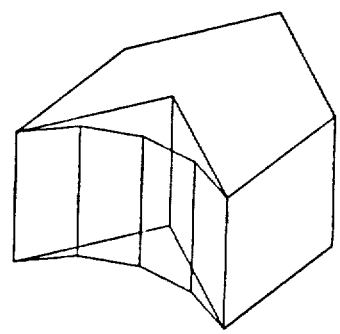

These effects are illustrated in FIGS. 4a, 4b and 4c, where a polygonal prism has been grown and then shrunk back under control of rays (in rayset R) perpendicular to its axis. FIG. 4(a) shows the sweptspace after the first, $gr_{2R}$, stage. Here, the sharpness of original concavities has been propagated, but if inward "cusps" are then rounded by a $shr_R$ operation, there results an intermediate sweptspace, FIG. 4(b), which is "half-way back" and "rounded everywhere"; shrinking "all the way back"—either from the FIG. 4(a) sweptspace using $shr_{2R}$ or the FIG. 4(b) one using $shr_R$—creates the fill of FIG. 4(c). A different aim might be to round along all vertical edges of the prism while leaving the central regions of each of its faces in fixed locations—the sequence, a simple extension of the above.

Figure 2:
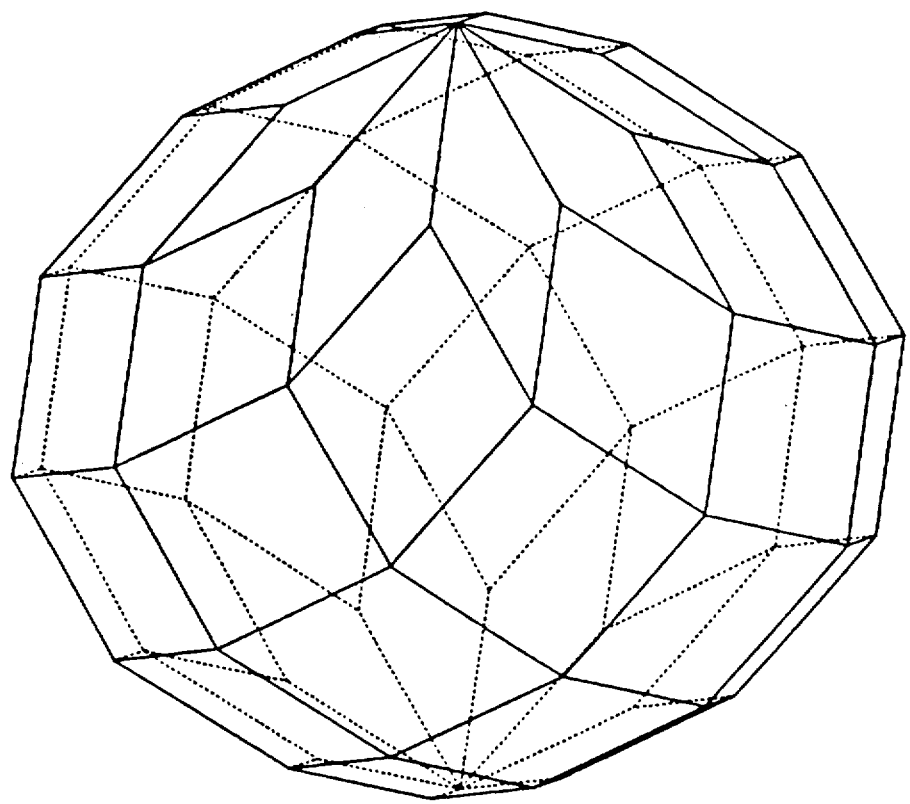
FIG. 2 illustrates a swell generated by an eight element rayset.
Figure 5A:
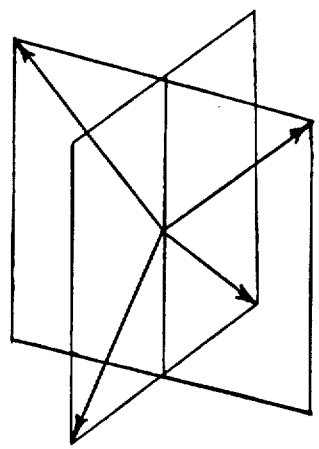
Figure 5B:
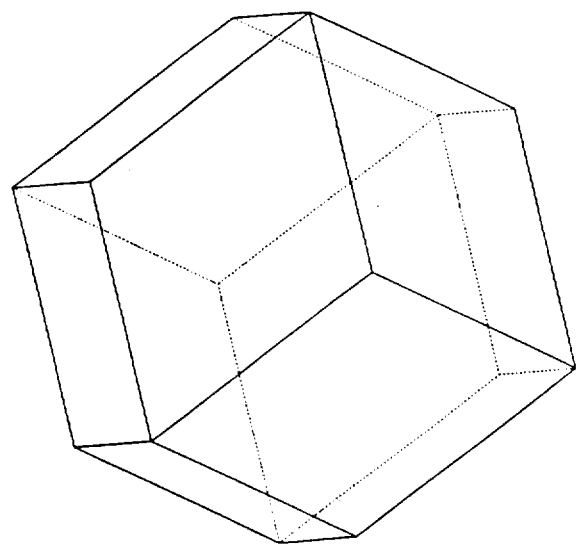
Figure 6:
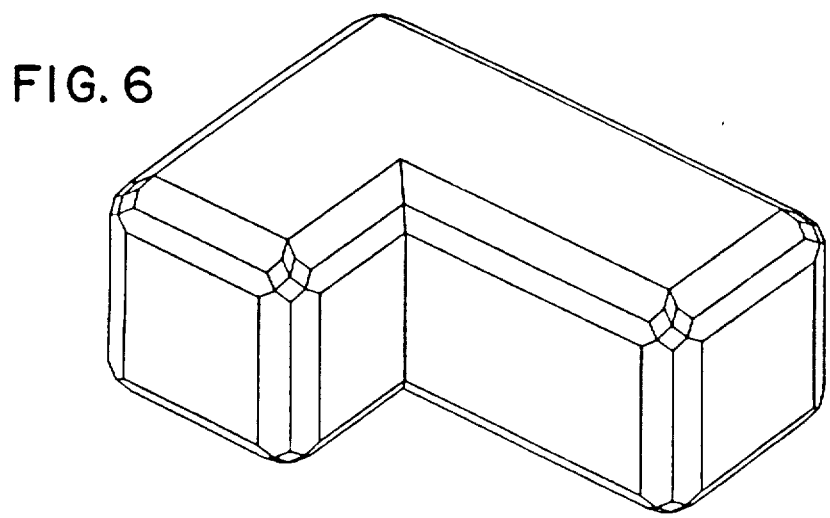
FIG. 6 illustrates polyhedron grown from an L-shaped prism by a four-rayed CTS.
Figure 7A:
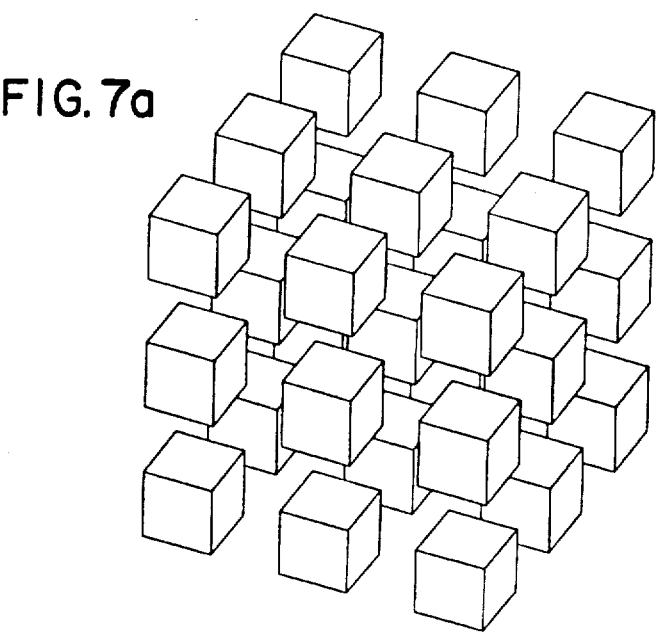
Figure 7B:
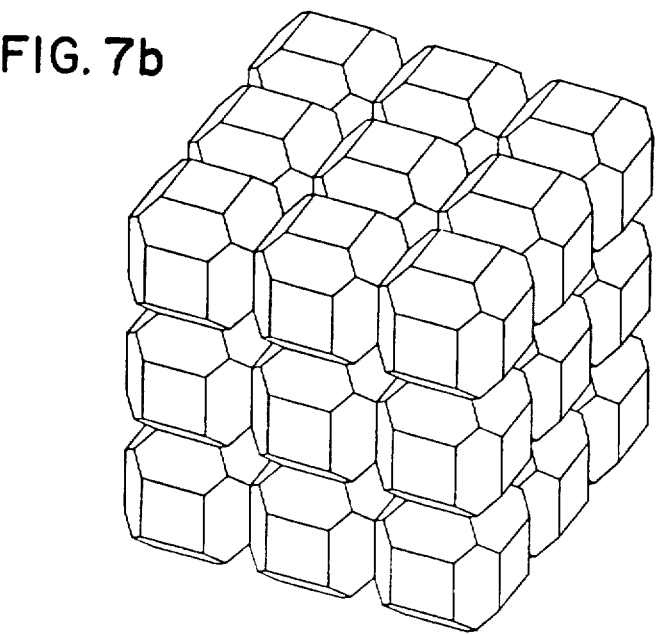
Figure 8:
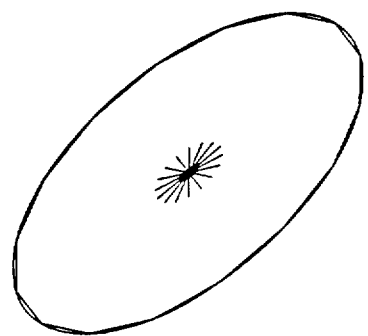
FIG. 8 is an illustration of a swell approximating a sheared ellipse (outermost boundary), showing rays (center) and approximating polygonal swell (inscribing the ellipse).

We illustrate rounding under control of two 3D swells, the four-rayed rhombic dodecahedron of FIG. 5b and the eight-rayed swell of FIG. 2. When the latter is combined with an L-shaped cylinder, the CTS reshapes the cylinder as shown in FIG. 6. And the effect of the four-rayed sweep, applied to a 3 by 3 lattice arrangement of unit cubes, is shown in FIGS. 7a and 7b. The input lattice, FIG. 7(a), was grown from a single point by a sequence involving three orthogonal rays, one application of gr and six applications of gri; the reshaped lattice, FIG. 7(b), restates in each of its 27 repeated "modules" what the four-ray sequence does to a single cube—or, with a slight twist, what a particular seven-ray sequence would do to a point.

PROPERTIES OF RAY-BASED SWELLS

As a zonotope, a swell, $S_R$, is known to be convex, centered, and compact (for Euclidean space, closed and bounded)—say a 3C set. We suggest here how these properties may be established, as consequences of attribute preservation under set summation. Readers familiar with these arguments may wish to skip ahead to the discussion on the shape of planar swells.

$S_R$ is convex.

Line segments are convex, so it suffices to show that set summing preserves convexity, i.e., that if A and B are convex so is $A+B$. Let $x_1 = a_1 + b_1$ and $x_2 = a_2 + b_2$ be any two points of $A+B$, and consider an arbitrary convex combination of them, say $x_3 = \alpha x_1 + (1-\alpha)x_2$. Then $x_3$ is clearly re-expressible as $[\alpha a_1 + (1-\alpha)a_2] + [\alpha b_1 + (1-\alpha)b_2] \equiv a_3 + b_3$. As a convex combination of A-points, $a_3$ is in A, and similarly, as a convex combination of B-points, $b_3$ is in B; hence $x_3 \equiv a_3 + b_3$ is in $A+B$.

$S_R$ is centered, at $(\Sigma r_n)/2$.

Observe first the effect of set summing two centered sets: If set A is centered at $c_a$, and B at $c_b$, then $A+B$ is centered at $c_a + c_b$. For, if $a+b$ is a representative point of $A+B$, with $a \in A$, and $b \in B$, then $c_a + c_b$ tests as a center, because for any $\alpha \in [0,2]$, point $(a+b) + \alpha((c_a+c_b) - (a+b)) \equiv [a + \alpha(c_a - a)] + [b + \alpha(c_b - b)]$ is expressed on the right side this identity as a member of $A+B$.

Then, since line segment $\bar{r}$ is clearly centered at $r/2$, it follows that $S_R = \bar{r}_1 + \ldots + \bar{r}_N$ is centered at $$(\tfrac{1}{2}) \sum_{n=1}^{N} r_n.$$

We note as a corollary that $S_R$ is centered at the origin iff its rays sum to 0; this is of interest when considering the distribution of new material that a body acquires during cumulative sweep.

$S_R$ is closed.

More strongly, we show that if B is closed, so is $S_R(B)$; the particular result comes by taking $B = \{0\}$. We assume, since the argument is finitely repeatable, that R is the singleton, $\{r\}$; then $S_R$ is $\bar{r} \equiv \{\alpha r: 0 \leq \alpha \leq 1\}$, and we show that set $B^+ \equiv B + \bar{r}$ is closed, i.e., that if x $B^+$, then x is not a limit point of $B^+$: Take x $B^+$ and consider line segment seg $\equiv \overline{px}$, where $p = x - r$; it clearly avoids B, and since seg is a compact set outside the closed set B, there is an $\epsilon > 0$ such that set seg $\equiv E(\epsilon, seg)$ avoids B. Now, seg is a sausage-shaped set that covers on one end an $\epsilon$-neighborhood of p, $E(\epsilon, p)$, and on the other an $\epsilon$-neighborhood of x, $E(\epsilon, x) \equiv r + E(\epsilon, p)$. So $\overline{seg}$ is of sufficient size that every line segment parallel to r which spans its interior has length $> |r|$; it follows, if $b \in B$, that $b + kr$ can lie in $E(\epsilon, x)$ for no positive $k \leq 1$, and thus that x is not a limit point of $B^+$.

$S_R$ is bounded.

Since $x \in S_R$ is expressible as a sum of rays with coefficients from $[0,1]$, $|x|$ is bounded by $\Sigma |r_n|$, summed over all rays in R.

A tighter directional bound is available. For a convex body K that contains 0, the normalized support function of K, in direction $\mu$, is defined by $h(K, \mu) \equiv \max <x, \mu>, x \in K$; this value represents the directional extent of K in the $\mu$ direction, i.e., the distance between 0 and that support plane of K which has its outward normal $\mu$ pointing into the non-K halfspace. When in reference to zonotope $S_R$, in order to emphasize the relationship to rayset R, we denote this support function by $H_R(\mu)$ and term it the height of the swell in direction $\mu$. If the swell is centered at 0, this is one-half the convex set width in the $\mu$ direction; in general, the width of the swell in the $\mu$ direction is $H_R(\mu) + H_R(-\mu)$.

$S_R$ attains its height, $H_R(\mu)$, at the point which is the sum of the rays, if any, that point into the $\mu$ halfspace-or at 0 if there are none. For if R has no ray pointing into the $\mu$ halfspace then clearly $<x,\mu>$ is maximized, $x \epsilon S_R$, by $x=0$; otherwise the maximum is sought with respect to representative points of form $x = \Sigma a_n r_n$, with coefficients $a_n \epsilon [0,1]$, and for such a point, $<x,\mu> \leq <y,\mu>$, where $y = \Sigma r_i$ summed over exactly those rays for which $<r_i,\mu> > 0$.

We also remark that $H_R$ completely determines $S_R$.

We will later observe a simple result—that reversing a ray's direction translates a swell without altering its shape; since, also, rays may be applied in any order, we may determine the shape of a swell by studying whatever sweep curve (among all those which differ only by the ordering or direction of their segments) most easily reveals it. In the planar case, there is always among such equivalent curves one whose discrete turnings are all in the same angular direction and of cumulative amount at most 180°. Having chosen such a representative curve, the central symmetry property allows us to invert it through the center of symmetry and so exhibit as subset of the swell a simple closed curve formed of that representative and its inverted image; convexity then establishes the inclusion of the planar region inside the closed curve; and an argument based on swell heights, $H_R(\mu)$, establishes the exclusion of planar region outside it—and so completes the swell's characterization. As an example, any a sweep curve which polygonally inscribes a semicircle generates a swell that inscribes the corresponding circle.

For a swell in a higher dimensional space, the above technique permits determination of the shape of any of its planar projections; one considers the projected planar raysets.

Behavior of swells under affine transformations

If L is a linear transformation and A a subset of its domain, denote by LA the image set $\{L(a): a \epsilon A\}$. Then the fact that everything is additively defined and L is linear results in this immediate conclusion:

$$LS_R = S_{LR}.$$

If sweptspace is considered, the corresponding result is:

$$LS_R(B) = S_{LR}(LB).$$

These have useful consequences:

Approximations by swells. If R is a known rayset such that $S_R$ approximates A (perhaps a sphere), then LR is a rayset such that $S_{LR}$ *approximates LA (perhaps an ellipsoid)*. As a 2D example, see FIG. 8. A rayset comprised from 16 rays originally equally spaced around a circle—and, which, if taken as such, would have generated an approximately circular swell—has been transformed so that its swell approximates a tilted ellipse.

There are also swells to approximate the unit ball in any dimension. The Hausdorff distance betweem sets X and Y is $p(X,Y) = \max\{\sup_{x \epsilon X} \inf_{y \epsilon Y} |x-y|, \sup_{y \epsilon Y} \inf_{x \epsilon X} |y-x|\}$. Using this metric in a d-dimensional space, Betke and McMullen bounded the infimum distance between the class of n-rayed zonotopes and the unit ball, B; the infimum lies between values $\beta_d n^{-2}$ and $y_d N^{-2/(d-1)}$, for constants $\beta_d$ and $y_d$ independent of n. In 3D, the principal author tested spherical approximations base upon two experimental rayset sequences, one that employed rays pointing toward mesh points of an ever-refined geodesic dome, another whose rays pointed in ever-tighter spiral patterns around a "northern" hemisphere. The number of rays needed to achieve (statistically tested) aspect ratios below 1.01 was determined—approximately 2500 under either sequence.

Determination of a swell's shape. If L projects into a plane, then the earlier remarks, about determining shape of planar swells, apply to $S_{LR}$, permitting the full determination of the shape of its planar projection. Although this does not complete the determination of the shape of $S_R$, it is a very helpful aid to its conceptualization. It has been of use when designing raysets to achieve particular growth profiles in each of three mutually orthogonal directions.

Changing a swell's shape to vary the thickness of deposited layers. The thickness of a deposited layer, cumulatively grown under the prescription of rayset R, is directionally dependent and given by the height function, $H_R$, described earlier. R may have been designed, for example, to induce unit thickening in each of three orthogonal directions, say the cardial ones of xyz space, but different directional offsets may be preferred, such as 3,45, and 100 (while preserving the faceting pattern characteristic of R). To obtain them it suffices to linearly transform the rays of R by application of a diagonal matrix having as diagonal entries those three values; use of this observation in the OYSTER application area often involves the same scalar at each diagonal entry, entailing straightforward scaling of each of the rays.

To scale the thickness by k in the arbitrary direction of unit column vector $\mu$ (using $\mu^\tau$ for its row transpose), and to do so without altering thicknesses in directions orthogonal to $\mu$, one may apply transformation $I - (1-k)\mu\mu^\tau$. To independently scale the thicknesses in the three orthogonal directions given by the columns of orthonormal matrix U—and by three amounts given along the main diagonal of diagonal matrix D—one may apply $UDU^\tau$.

When used in combination with sweeps, translation is of equal interest to linear transformation. The basic observation is that translating a swept body is equivalent to sweeping a translated body; $v + S_R(B) = S_R(v+B)$, or, in expanded form, $v + (S_R + B) = S_R + (v+B)$.

Ordering the latter sum as $(v + S_R) + B$ suggests the interpretation that body B has been acted upon by a translated swell, an effect that may be grasped in terms of shift of hangpoint, i.e., in terms of an origin shift that creates a new effective hangpoint. Thus, translating a swell by v creates an effective hangpoint at $-v$, indicating a distribution of deposited material corresponding to a shifted point of conceptual coincidence between the swell and the boundary track of the body.

If $S_{R'}$ were to have the shape of $S_R$ but an effective hangpoint at v rather than 0, its layering effect would be given by $lay_{R'}(B) = gr_{R'}(B) - B = gr_R(B-v) - B$, and as such could be readily achieved.

An effective hangpoint at the swell's center of symmetry is achieved by translating by $v = (-\Sigma r)/2$. One at well boundary point, w, is achieved by translating by $-w$. It is sometimes useful to chose such boundary point w with respect to a given direction, $\mu$, as one of the boundary points at which height $H_R(\mu)$ is attained.

Figure 9A:
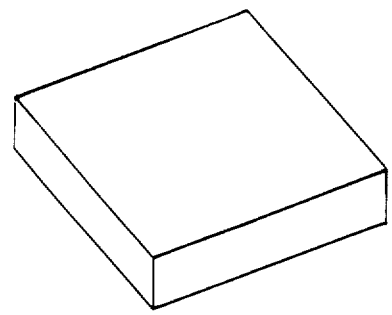
Figure 9B:
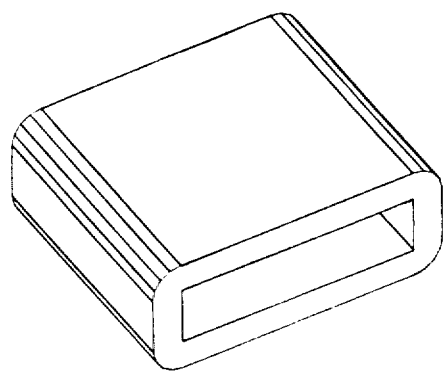
Figure 9C:
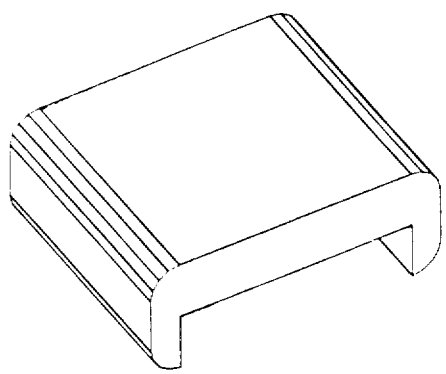

FIGS. 9a, 9b and 9c show the effects described. A layer has been grown from a rectangular slab, FIG. 9(a), as substrate in two different ways that both use the same swell but treat it in terms of a different hangpoint. When the effective hangpoint is taken at the swell's center of symmetry, we consider that it determines a balanced swell; it induces growth layers that have a balanced appearance, as in FIG. 9(b). When the effective hangpoint is taken somewhat "beneath" the center of symmetry deposits occur somewhat "above" the body and we call the swell a climber—in FIG. 9(c) the hangpoint has been placed at the swell's lower boundary, raising the developed layer to the high point shown. When the effective hangpoint is taken above the center of symmetry we call the swell a digger.

Reversal of ray direction

Reversal of ray direction effects a translation. For, if R' is produced from R by the reversal of a single ray r, then the associated swells differ by translation vector r, i.e., $r + S_{R'} = S_R$. In other words $r + (-r + X) = (r + X)$, but this is obvious, since $$r + -r = \{r + \alpha(-r): 0 \leq \alpha \leq 1\} = \{(1-\alpha)r: \ldots \} = \{\beta r: 0 \leq \beta \leq 1\} = r.$$

That ray reversal reduces to translation has important consequences:

Shift of hangpoint. Since a translation is involved, the previous section shows that ray reversal effects a hangpoint shift. For example, imagine in xyz coordinates that climber R has all its rays in the positive z halfspace, hence has swell with hangpoint (0) beneath it; reversing all of R's rays produces a digger, −R, with all of its rays in the negative z halfspace and swell with hangpoint on top; reversing some but not all of R's rays would have produced a swell with an interior hangpoint.

Economy of ray storage. First note that it is wasteful to store multiple rays in a common direction; their sequential application would have the same effect as the single ray defined by their sum. Then observe that multiple rays in opposite directions can be selectively reversed to all point in the same direction, the co-directed set then being replaced by a single ray; this replacement implies a translation in the sweptspace of swept objects, but that can be cheaply undone by translating the sweptspace back after it is computed—a much cheaper procedure than using multiple sweeps to compute it in the first place.

Choice of cheaper sweep directions. If a polyhedron P presents a complicated face structure in the direction of a ray r, but a simple pattern in the opposite, −r, direction, it pays to sweep in the −r direction and translate the result by r (since translations are far cheaper than sweeps); this applicaton of identity $r + (-r + P) = r + P$ is incorporated in OYSTER.

Equivalence of curves. We observed earlier that the order of applying the rays was irrelevant to the result, and we now see that the reversal of ray direction is irrelevant to the shape of the result (just altering its position, by translation). We take sweep curves to be equivalent if they produce geometrically congruent swells (identical but for translation and rotation). Among the equivalent sweep curves (and obviously many more) are those which differ only in the order of their segments and the direction in which they run; in a sense, time reversal—doing last things first, in the opposite direction—does not alter the shapes produced by cumulative translational sweeps.

$S_R$ as a convex hull; its vertices.

It is of interest to note that the vertices of a swell, and hence the swell itself (as convex hull of the vertex set), are expessible as a special sum over selected subsets of the rays. This is elaborated here:

We call X ⊆ R a strong subset of R, and $$v = \sum_{x \in X} x$$

a strong sum, if for some unit vector $\mu$, $<x,\mu> > 0$ for every x∈X, and $<r,\mu> < 0$ for every r∈R−X.

Vector 0 is not a strong sum, because for every vector $\mu$, $0 = <0,\mu>$.

Every strong sum is a vertex (of $S_R$), and every vertex other than 0 is a strong sum. This follows from an argument, using the $H_R(\mu)$ formulation, that shows a 1 to 1 correspondence between strong sums and support planes of $S_R$ that contain exactly one (non-0) point. The above shows that zonotope $S_R$ is the convex hull of {0}∪{strong sums}.

We note, marginally, that 0 is a vertex of $S_R$ iff R is a strong subset, and is a boundary point of $S_R$ iff R is "almost strong," i.e., satisfies the strong conditions if the strict greater than (>) is replaced by (≥).

OYSTER CTS APPLICATIONS

Recent developments in integrated circuit technology and predicted future trends point to the need for better modelling tools to help link a technology's design and manufacturing phases. The aim of fabrication modellers such as OYSTER is to model the geometric form of silicon devices at each stage of their manufacture, in order to aid device designers, who may derive operating characteristics from the models, and manufacturing engineers, who may use them to investigate allowable tolerance bounds.

OYSTER takes the designer's mask artwork and the manufacturing engineer's step-by-step description of the fabrication process as its inputs. It requires the same Boolean engine as more typical mechanical CAD/CAM applications, but must deal with more unusual shapes. In the silicon process world, the forms of materials that take shape on the wafer are continuous in layer-by-layer conforming patterns, suggestive of geological strata that flow and twist in unexpected and irregular ways. OYSTER attempts to capture the roundness of the layers and to accurately reflect their varying thicknesses, which depend upon the directional orientations of the various device elements.

A process step that occurs repeatedly is the deposition of a new material layer upon an old. Although different methods of deposition and different material types effect distinctive layer shapes, all deposited layers do conform in shape to their underlying support. OYSTER achieves such new layers by applying the grow operation to a composite union of underlying layers and then Boolean differencing the result and underlying composite.

Figure 10A:
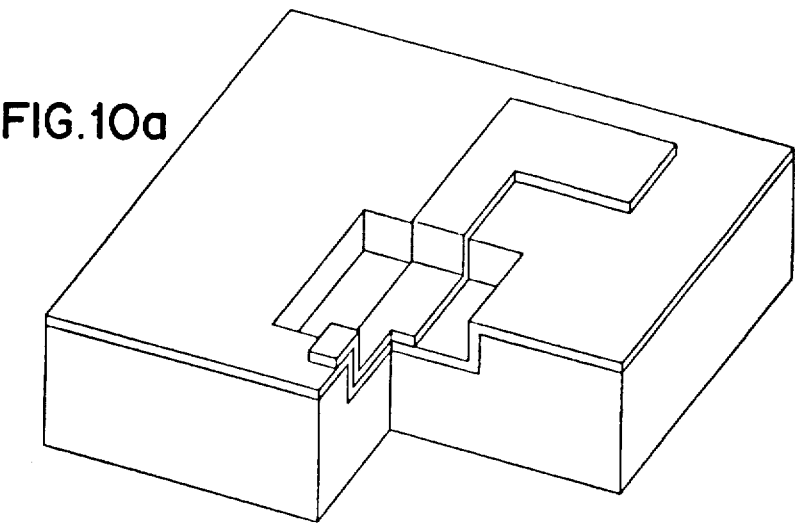
Figure 10B:
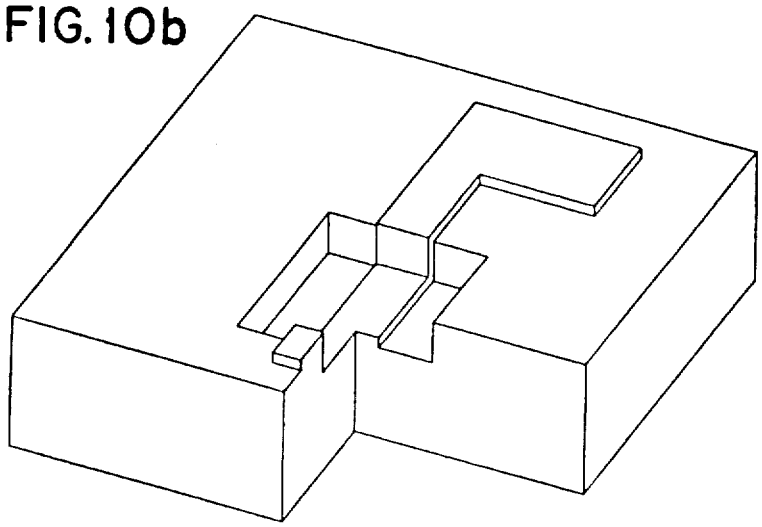
Figure 10C:
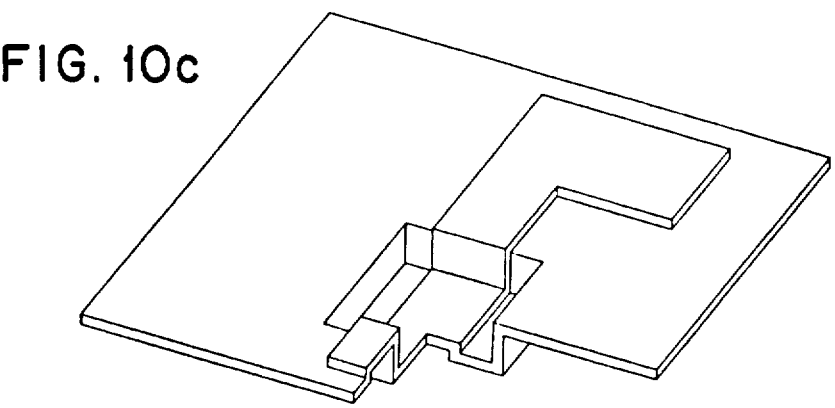
Figure 10D:
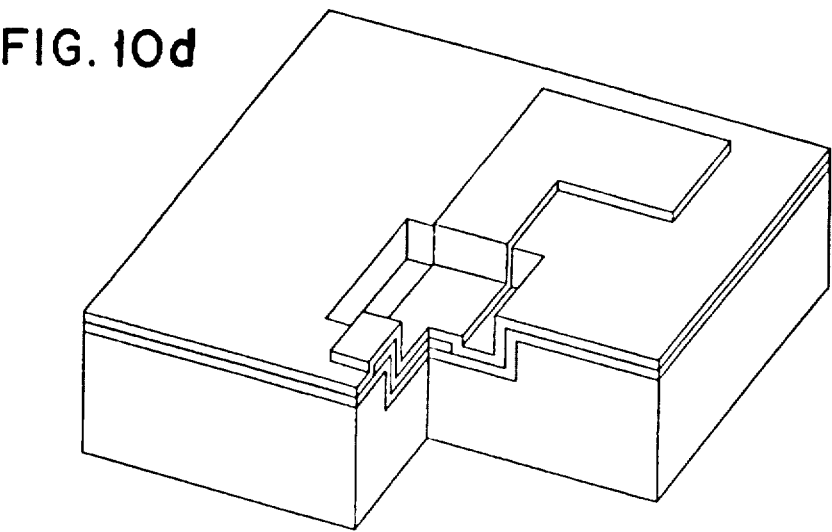

FIGS. 10a, 10b, 10c and 10d provide an example. FIG. 10(a) shows a cut-out view of an OYSTER model, representing a device which, during its manufacture, has developed several layers. The fabrication step to be illustrated is a uniform coating of the device by a new blanket material layer of specific thickness. To model the step, a union is created of all existing device components, as shown in FIG. 10(b). The composite union might then be swept (in the simplest case) along three orthogonal directions and a new layer then be derived by a Boolleaan difference which removes the composite from the swept composite, FIG. 10(c); the derived layer is shown in place, above the original layers, in FIG. 10(d). Square edges and corners in the layer reflect the box-shaped swell employed. The combined use of Boolean and sweep operations illustrated in this example is typical of OYSTER algorithms which model fabrication steps.

Figure 11:
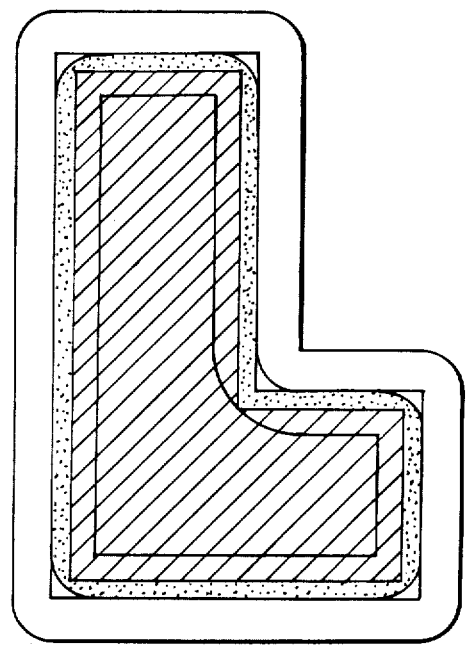
FIG. 11 illustrates mask shaping by repeated CTS operations in which the cross-hatched area is an original mask shape, an enlarged border surrounding original mask grown by 2 element rayset, a solid shaded area is sweptspace addition with faceting, an outer border bounds area grown by 8 element rayset, and an inner shape bounds area shrunk back by 8 element rayset.

In modelling silicon fabrication, it is important to take into account the shape rounding due to the lithography steps. The mask defining the L-shaped gate region layer used in FIG. 10 can be considered a typical lithography mask shape as drawn by a device designer. Because of exposure tooling effects and material effects during the chemical development of the photoresist that has been exposed with the mask, the square corners become rounded, with a radius that is generally technology dependent. The CTS techniques permit us to facet around the corners and simultaneously grow or shrink the mask to compensate for fabrication effects. FIG. 11 shows how an appropriate combination of grow and shrink operations with the rayset of FIG. 5(a) is used to grow the original mask uniformly over the boundary while inducing faceting at both convex and concave corners.

Figure 12A:
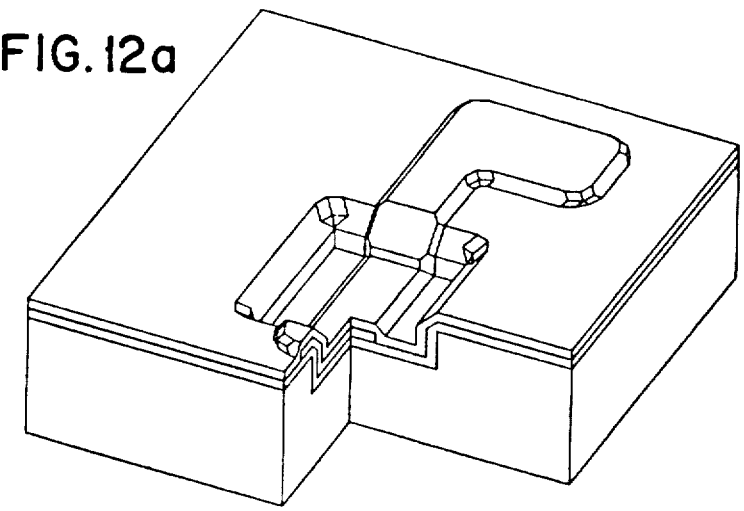
Figure 12B:
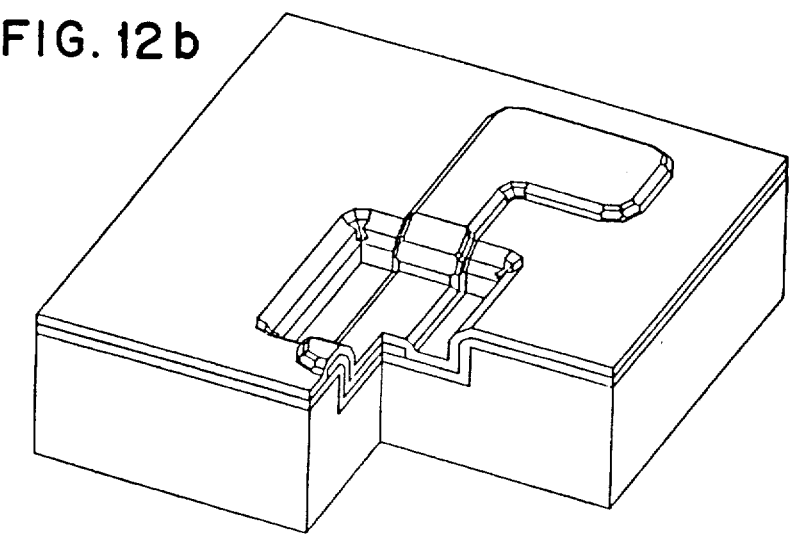

FIGS. 12a and 12b show the effect of combining planar mask faceting and deposition faceting to achieve more realistic device shaping. Both masks that were used, to define the well area and the gate shape, have been rounded, as may be seen in FIG. 11. A transmitted rounding is seen in corresponding faceted shapes in the device, as shown in FIG. 12(a). Compare the shapes in FIG. 12(a) to FIG. 10(a). The well has been etched vertically downward in both figures, but the material layer beneath the gate has been deposited with one edge facet by using the rayset of FIG. 5(a). The L-shaped gate region has been applied in a blanket layer and vertically etched as in FIG. 10(a), but note that its shape, when dipping into the well, conforms to the edge faceting of the material layer below it.

FIG. 12(b) has been created using the same rounded masks as in FIG. 12(a) but the depositions were done with two edge facets instead of one, using a swell designed for double faceting, that of FIG. 2. Details of rayset construction and swell hangpoints are made transparent to the OYSTER user, who merely selects the number of facets by setting a global parameter.

Further applications occur in other OYSTER fabrication step simulations. Thus, for etching, a very thin blanket layer is first grown and then intersected with the complement of the composite union; this identifies which portions of the device are exposed to the etchant. Similar methods, that create and use temporary intermediate layers, give OYSTER an ability to simulate growth of thermal oxides.

The CTS technique is a good candidate for parallel processing, since particular "forward components" of a solid may be swept in parallel and then subjected a summarizing Boolean union.

CTS FOR GENERAL CURVES

We have discussed applications of the ray-based CTS, which is based on sweeps along piecewise linear curves. Families of such curves provide the limit sequences that establish the general class of rectifiable curves. Any particular such limit sequence, say of piecewise linear curves $C_i$ to establish rectifiability of curve C, would carry with it a natural sequence of zonotopes, $Z_i = S_{R_i}$ say, and the $Z_i$ sets would approach (under the Hausdorff metric) a limiting zonoid, Z, which is the obvious choice of sets to define as the swell $S_C$. Below, we develop this idea in terms of our earlier notation and usage.

Consider a rectifiable curve in Euclidean N-space, parameterized over [0,1] by a continuous function C, and let $\{\ldots, (a_i, b_i), \ldots\}$ be a finite sequence of disjoint [0,1] subintervals and $R = \{C(b_i) - C(a_i): i = 1, \ldots\}$ its corresponding rayset, we say that C supports R, or that R is based on C (is C-based); and, if the association with C is understood, we say that R is based on $\{\ldots, (a_i,b_i), \ldots\}$ Then the swell of C (or C-swell) is defined by $S_C = \text{closure}(U\{S_R: C \text{ supports } R\})$.

Figure 13:
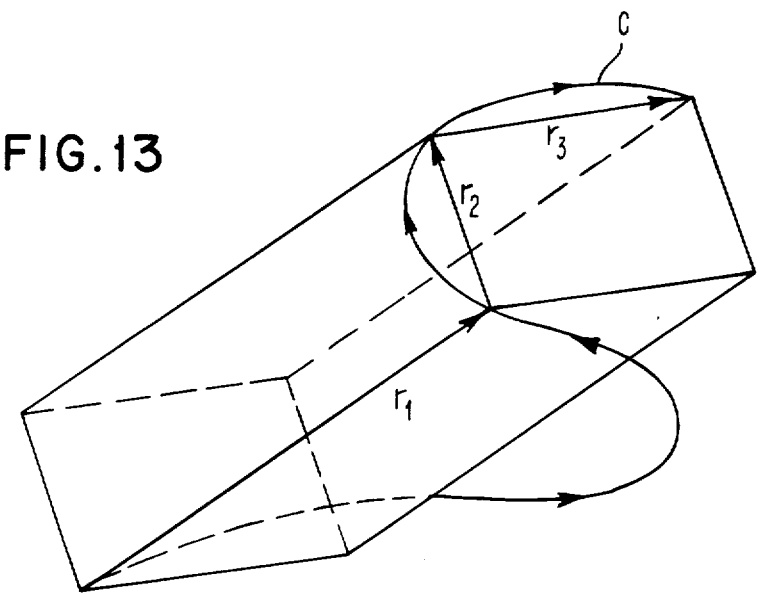
FIG. 13 is a drawing showing a general sweep curve and one of the infinitely many parallelepipeds that its swell contains.

Under this definition, there are infinitely many raybased swells contained in $S_C$—any parallelogram generated from two supported rays, any parallelepiped generated from three, etcetera. FIG. 13 illustrates a curve, C, and one such parallelepiped.

We remark, without proof, that $S_C$ is the limit set of sequence $S_{R_i}$, having taken rayset $R_i$ in association with the ith partition of [0,1] in any refinement sequence that establishes C's arclength.

Swell-equivalence is introduced to identify curves, under this choice of equivalence relations: $S_1 \sim S_2$ if swells $S_1$ and $S_2$ differ at most by translation and rotation; and $C_1 \sim C_2$ if $S_{C_1} \sim S_{C_2}$.

We say a collection of disjoint domain subintervals, $\{\ldots, (a_j,b_j), \ldots\}$, may be refined by splitting into several, one or more of its members; it may be completed, extended to fully span the [0,1] domain, by adjoining each missing subinterval. Thus, $<(0,.2),(.3,.7)>$ may be refined in many ways, perhaps to $<(0,.1),(.1,.2),(.3,.7)>$, but may be completed in only one, as $<(0,.2),(.2,.3),(.3,.7),(.7,1)>$.

If rayset R is C-based with respect to an incomplete sequence and is extended by adjoining the missing rays from its completed sequence, then the extended rayset, denoted by R*, is called complete, or the R completion. If R' is based on a refinement of the domain subintervals associated with R, it is called an R refinement.

We make these observations:

The new notation extends the old consistently; if C is any one of the curve segments obtainable by stringing together, start-to-end in any order, all directed line segments associated with the rays of R, then $S_c = S_R$.

One curve equivalent to C is the translate, $C \equiv C - C(0)$, having $C(0) = 0$.

Since each singleton, $\{C(t) - C(0)\}$, is clearly a C-based rayset, $C \sim S_c$.

Operations on curve segments that preserve swell-equivalence include translation; rotation; repositioning, start-to-end, the members of a finite family of C-subsegments that span C; first reversing the direction of some, and then repositioning the members of such a family. To briefly elaborate:

The affine behavior is this: for a linear transformation, L, $$LS_c = S_{LC}$$

and for a translation, $$v + S_c = S_{(v+C)}.$$

Reversal of direction (assuming, without loss of generality, that $C(0) = 0$ and $\overline{C}(t) \equiv -C(t)$):

$$S_{\overline{C}} = -S_C = -C(1) + S_C \equiv C(1) + S_C.$$

Segmentation into subsegments $C_1, \ldots, C_n$:

$$S_C = S_{C_1} + \ldots + S_{C_n}.$$

The nesting of completed refinements.

If R* completes R then, clearly $S_R \subseteq S_{R^*} \subseteq S_C$; and if R' refines R, then $S_R \subseteq S_{R'} \subseteq S_C$. The latter follows from the fact that, using the refinement structure, each ray $r_i$ of R may be re-expessed as a sum, $$\sum_{j=1}^{k_i} r'_j,$$

over rays of R', representative sums from $S_R$ being similarly re-expressed as belonging to SHD R'.

If $R_1$ and $R_2$ are C-based, they have a common completed refinement R; it may be constructed in a unique way by completing that refinement of [0,1] that involves exactly the division points associated with either $R_1$ or $R_2$. Then, for i=1 or 2, $S_{R_i} \subseteq S_R \subseteq S_c$.

$S_C$ is convex.

Let p and q be points of $S_C$, and $\alpha\epsilon[0,1]$. We must show that $x = \alpha p+(1-\alpha)q \epsilon S_C$. Take $p_i \to p$ and $q_i \to q$, with $p_i$ and $q_i$ in a common C-based rayset $R_i$. Since $p_i$ and $q_i$ belong to the convex zonotope, $S_{R_i}$, so does the point $x_i = \alpha p_i+(1-\alpha)q_i$; and $x_i \to x$; thus, since $S_C$ is closed, $x \epsilon S_C$.

$S_C$ is centered, at $c \equiv (C(1)-C(0))/2$.

Note first that for any complete C-based R, $S_R$ is centered at $(C(1)-C(0))/2$, since it is centered at half the sum of its rays, which for a complete rayset telescopes to the stated value. Then, to complete the proof, we show that, if $p\epsilon S_C$ and $\alpha\epsilon[0,2]$, then $p+\alpha(c-p)\epsilon S_C$: If p lies in some complete C-based R, then the observation above gives the result; otherwise, an argumet strictly parallel to the above convexity argument shows that $q(\alpha) \equiv p+\alpha(c-p)$ is approached, through $S_C$, by $q_i(\alpha) \equiv p_i+\alpha(c-p_i)$ and hence lies in $S_C$.

As corollary, $S_C$ is centered at the origin iff C is a closed curve.

The above two properties (convexity and centrality at . . . ) are helpful in understanding what regions $S_C$ must include. Assume, for convenience, that $C(0)=0$, and note that when p is taken as $C(t)$, it reflects through the $C(1)/2$ center into $q \equiv C(1)-C(t)$, and as p describes the C curve q describes the reflected curve C. Then the swell of rayset $R \equiv \{p, q\}$ is bounded by the parallelogram having vertices at 0, p,p+q=C(1), and q, and as t varies it moves through space "annexing tertitory for" $S_C$. (For planar curve C that turns in one direction through at most 180°, these observations confirm one made previously: that $S_C$ consists of that planar region bounded by the closed curve formed from C and its central inversion.)

$S_C$ is closed—by definition.

If closure were not part of the defintion, then such a curve as the following would not have a closed swell (in fact its $S_C$ would contain only two of its boundary points): In the xy plane, let the x-axis interval $I_k \equiv [1-2^{-k}, 1-2^{-(k+1)}]$, $k \geq 0$, . . . be the domain of $C_k$, a diameter $2^{-(k+1)}$ semicircle (say in the $y \geq 0$ halfplane if k is even, and in the $y \leq 0$ halfplane if k is odd), and let C be $$\bigcup_{k=0}^{\infty} C_k$$

together with point (1,0). Without closure, the swell of this snakelike curve would be the open disk of radius 0.5 centered at (0.5,0) together with two boundary points, (0,0) and (1,0); closure brings in the entire boundary.

$S_C$ is bounded by the arclength of C. If $p\epsilon S_R$ is not 0 and $\mu$ is its unit vector, we have $$|p| \leq t_R(\mu) \equiv \sum_i <\mu, r_i>,$$

where the sum is taken over the rays in R that point into the $\mu$ halfspace. Expressing this sum in terms of the C parameterization, as $$\sum_i <\mu, C(b_i) - C(a_i)>,$$

exhibits p as bounded by C's arclength, the least upper bound (lub) over all C-based finite sums $$\sum^N | C(b_n) - C(a_n)|.$$

This arclength bound clearly applies to arbitrary points in $S_C$, as limit points of such p's.

The $\mu$-height of $S_C$ may be defined, for a unit vector $\mu$, by $H_C(\mu) \equiv $ lub $H_{R_i}(\mu)$, where the least upper bound is taken over all C-based $R_i$. This is the total variation of function $$f(t) \equiv \max \{0, <\mu, C(t)>\},$$

also expressible as $$\int_0^t \max\{0, <\mu, dC/dt>\}dt.$$

$S_C$ has been observed—as zonoids always have been, as zonotopes $S_R$ were before it—to be a 3C set, convex, centered, and compact. Are 3C sets always derivable as swells? No. One example of a three-dimensional 3C set which is not a swell is the regular octahedron: all 3D zonotopes have faces with evenly many sides, but the octahedron's faces are triangular. In 0-, 1-, or 2-space, however, one can find a swell to generate any 3C set:

A zero-dimensional 3C set is a point, and is swell-equivalent to $S_c$ for $C(t) \equiv 0$.

A one-dimensional 3C set is a closed line segment, say of length k. It is swell-equivalent to $S_c$ for $C(t)=t(k\mu)$, any unit vector $\mu$.

A two-dimensional 3C set, A, has any semi-perimeter, C, as a generating curve; i.e., $A=S_c$. This may be shown as follows:

Assume, without loss of generality, $C(t), t\epsilon[0,1]$, parameterizes a semi-perimeter beginning at $C(0)=0$.

To show $A \subseteq S_C$: If $0 \neq x\epsilon A$ and $y\epsilon(\sigma A) \cap$ (half-line extension of segment $\bar{x}$), then for some $\alpha$ and some t, both $\epsilon[0,1]$, $x=\alpha y$, and either $y=C(t) \equiv p$ or $y=C(1)-C(t) \equiv q$; this establishes $x\epsilon S_{\{p,q\}} \subseteq S_C$ Finally, to show complement(A) $\subseteq$ complement ($S_C$): if $x \notin A$, then let $\mu$ be its unit vector and let $a_x$ be its nearest point in A (which exists, because A is compact). Using A's convexity, A has a support plane P which passes through $a_x$ perpendicular to $\mu$ and locates x in the open non-A halfspace, $\{p: <\mu,p> > <\mu,a_x>\}$. And P may be assumed to support A's convex boundary curve C, say at $a_x=C(t_o)$. (If P instead supports C's centrally reflected image, the argument can be rephrased in terms of x's central reflection.) Then the directional variation of C in the $\mu$ direction is realized by $|<\mu,$ $C(t_o) > | = H_c(\mu)$. Combining these observations, we have $<\mu, x>><\mu, a_x> = \text{ub}\{<v, \mu>: v \epsilon S_c\}$, hence $x \quad S_c$.

The above completes a phase of discussion that has associated general curves with zonoids, just as an earlier phase had associated piecewise linear curves with zonotopes; the key to the association, in each case, has been the use of a new sweep type—the cumulative translational sweep—that directly links the curve to a "swell" (now read zonoid).

We mention one furhter generalization before concluding: A limited-memory CTS, having memory of duration d, may be defined with clear intuitive sense in terms of a sweep curve, C(t), that has been parameterized by arclength, say by $t \epsilon [0, T]$: Let d be a continuous real-valued function on [0, T], satisfying $0 \leq d(t) \leq t$ (for the simplest case—memory of fixed duration—d(t) might be min $\{D, t\}$, for some constant, D). Let $C<d,s>$ be the segment of C defined over parameter subinterval $t \epsilon [s-d(s), s]$. The CTS with memory of duration d that is defined under these circumstances is that sweep which generates as its swell, $$S_{(C,d)} = \text{closure}(\cup \{S_{C<d,s>}: 0 \leq s \leq T\}).$$

Swells of a limited-memory CTS lack the properties of convexity and central symmetry we have come to expect; other properties are also lost to the limited memory—such as the permutability of curve subsegments and the expressibility of the swell as a Minkowski sum of subordinate swells associated with a curve partitioning. In spite of these "failings," which make the limited-memory CTS more difficult to analyze than its unlimited correspondent, we believe the sweep type has considerable theoretical interest—that it may provide a conceptual tool for thinking about (even simulating) those phenomena in which temporal events may be associated with limited spatial effects. The richness of the constructs involved permits, for example, time-varying duration functions, d.

This work has shown how CTS curves determine shaping bodies that are zonoids of the zonotope subclass. It is possible that, once the problem of how a general zonoid may determine an associated CTS curve is solved, CTS techniques might be used for the general zonoid. The solution must entail a plan, given a convergent zonotope sequence, for selecting curves for each of its zonotopes in such a manner that the selected curves approach a limit. Thus, we ask: given convergent zonotope sequence $Z_i \rightarrow$ zonoid Z, how may one determine a convergent sequence of curves $C_i$ such that $Z_i = S_{C_i}$, $C_i \rightarrow C$, and $S_C = Z$?

OPERATION OF THE CTS SYSTEM

Figure 14:
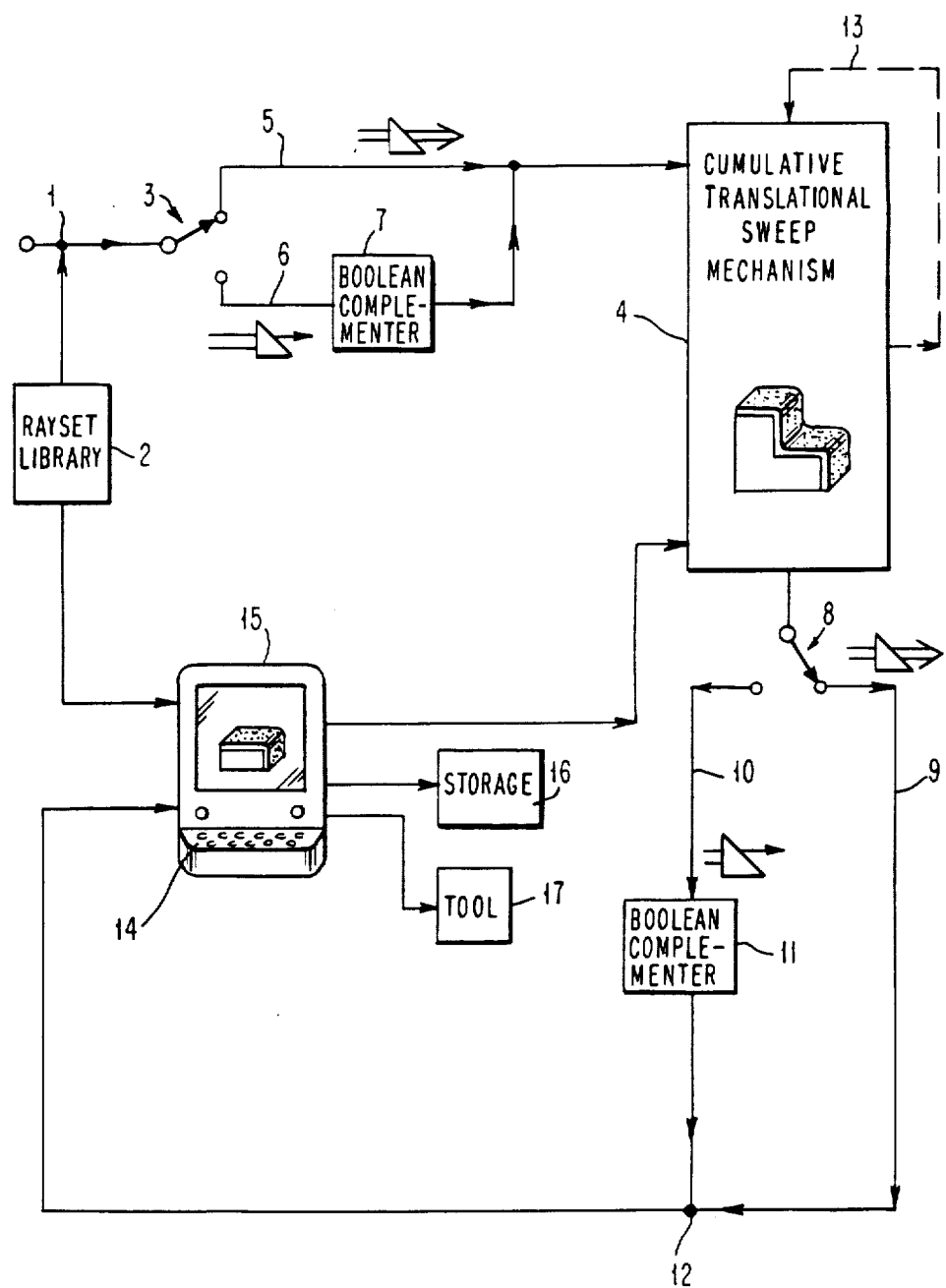
FIG. 14 is a diagram of the inventive method showing the use of a rayset for modelling operation.

FIG. 14 shows the basic shaping operation using controlled cumulative translational sweeps according to a parameterized operational rayset, a stipulated operational rayset and parameters of shape, balance, conexity/concavity (CMODE), degree of faceting and memory limitation. The selected structuring geometric shape, a zonotope, is provided at input node 1 from an external source, or from an internal source such as rayset library (RL) 2. The geometric object to be shaped may be provided from the same inputs, or other inputs not shown. Stipulations of parameter values, used for control, are provided at input node 1, The grow-shrink decision, made by the user, is implemented by switch 3, which provides a connection for the input of the rays which determine the structuring geometric shape. The ray inputs pass directly via path 5 for the grow operation, in the form of a parameterized operational rayset which controls a cumulative translational sweep by CTS mechanism 4. Alternatively, a shrink operation may be selected by using switch 3 to select path 6, through Boolean complementer 7, and thence to CTS mechanism 4. The CTS mechanism 4 carries out a sequence of cumulative translatonal sweeps, one per ray of the operational rayset from rayset library 2, sweep of sweptspace of the previous sweep. Additional iterations of the sweep operation, before the final shaped geometric model is made available, are carried out by CTS mechanism 4, one for each additional ray of the rayset from input node 2. This iteration, ray by ray, is indicated graphically by broken line 13. The output is made available via switch 8 directly via path 9 for the grow operation (or alternatively, if the user has chosen a shrink operation, via path 10 and Boolean complementer 11) to output node 12.

The operation, stated most generally, is to sweep the input geometric model in accordance with the parameterized operational rayset, including stipulated parameters of scale, balance, (CMODE), degree of faceting and memory limitation. Each sweep is applied to the sweptspace of the previous sweep, to carry out the desired shaping operation, resulting in a reshaped geometric model.

The lower left quadrant of FIG. 14 illustrates the technique for rayset selection with user involvement. The initial rayset is generated by the user or taken from an input source which may be rayset library (RL) 2. As required, the rayset is modified iteratively to form an operational rayset. The user also accepts default parameters of scale and balance, or introduces appropriate values from keyboard 14 according to a menu prompt at terminal 15. The user selects for display a demonstration geometric model such as a point, line segment, rectangle or rectangular right prism. The reader will note that the demonstration geometric models identified are very simple forms, in series of increasing dimensional complexity. This simplicity is very useful in presenting to the user an understandable display of the result of the developing parameterized operational rayset upon the demonstration geometric model. This provides not only ease in review of the effects of changes to the rayset and parameters, but saves computer time. The simplified demonstration geometric models are not mandatory, however. The user may develop a personal library of favorite geometric models. The interim results applied to a specified demonstration geometric model are calculated and displayed on terminal 15 for acceptance or revision.

The user may prefer to manipulate and review the rayset using default parameters of scale and balance, and then enter the actual scale and balance values. Additional dimensions beyond 3-D are available, but some creativity may be required in their display with regard to demonstration geometric models on a terminal with 2-D display.

When the user is satisfied with the result of shaping the demonstration geometric models in accordance with the parameterized operational rayset, the user may choose one or more of the following operations:

update the values in rayset library (RL) 2;

add the parameterized operational rayset to the rayset library (RL) 2;

run the operation controlled by the selected parameterized operational rayset in CTS 4 on the actual geometric model.

The CTS system then carries out the operation by calculating the controlled cumulative translational sweeps, performing shaping operations on the actual geometric model according to the parameterized operational rayset, and using the result in utilization devices such as display terminal 15, storage (S) 16 and integrated circuit process tool (T) 17.

SUMMARY OF METHOD OF OPERATION

The inventive method is as follows:

A method for shaping a geometric model, comprising the following steps:

(a) providing for entry of a parameterized operational rayset of n rays, which rays determine a structuring geometric shape;

(b) applying to the geometric model a translational sweep corresponding to the first ray of said parameterized operational rayset, resulting in an initial sweptspace;

(c) iteratively applying to the sweptspace of the respectively preceding sweep a translational sweep corresponding to the next ray of said parameterized operational rayset, until a sweep corresponding to ray n has been applied, resulting in a final sweptspace which is the desired shaped geometric model; and (d) providing the shaped geometric model to a utilization device.

The scale parameters include directional scope of swell (growth, shrinkage or translation) of the operational rayset; the balance parameters include direction of layering effect; the CMODE parameters control the sequence of operations to determine whether one or both of the locally convex or concave boundary regions are to be rounded; the degree of faceting parameters trade off modelling precision for computation economy; the memory limitation parameters determine the portion of the sweptspace of the previous sweep to which the current sweep is to be applied. The initializing of the rayset determines the structuring geometric figure; the rayset is set to values defining a shaping polyhedron from the zonotope subfamily of polytopes. One or more of the initializing steps may be omitted if the system has been previously set with default values.

Polyhedral modelling systems commonly include direction-of-face indicators. These indicators are used in automatic economization of resource usage by the system, by applying to each translational sweep step a decision whether to sweep forward or whether to sweep in reverse. In certain situations, the reverse sweep may be much less resource-consuming than the forward sweep. The reverse sweep may be much simpler than the forward sweep in that the input geometric model may have only one or a few faces in the direction of the reverse sweep, while in the direction of the forward sweep it might have many faces. Note that a reverse sweep results in a shaped body which is congruent to that of a forward sweep but translated to a different position. A translation error will be induced by reversing the sweep; such translation error will cost the overhead of a corrective retranslation. The overhead of the corrective retranslation, however, is insignificant as contrasted to the savings from sweeping fewer faces. The overall economy of use of computational resources is greatly advantaged by investing in the small cost of corrective retranslation for the greater saving in sweep simplicity. The method includes canvassing direction-of-face indicators to develop a sweep-direction-facecount along the direction of sweep and to develop a contra-sweep-facecount along the opposite direction, comparing the facecounts, selectively reversing the ray direction if the direction-of-sweep facecount is greater than the contra-sweep-facecount. This results in a congruent-but-translated sweptspace. The saving from this simpler procedure may greatly outweigh the necessary substeps for performing a translation operation to correct for the induced translation.

The utilization device may be a display, a storage device or a process control tool which operates in accordance with the shaped geometric model, either in open loop mode or in closed loop mode. In closed loop mode, information concerning previous iterations or interim process steps is made available, for example, as a change in scale. Such a parameter change may cause further changes in other parameters as the process is repetitively followed, thus keeping the process current.

DEVELOPING PARAMETERIZED OPERATIONAL RAYSET

A menu-prompted method of setting up the rayset and related parameters of scale, balance, CMODE, degree of faceting, and memory limitation, and of selecting the structuring polyhedron, normally will include access to a library of standard operations plus favorite operations previously carried out by the particular use. The user may start with previously set up defaults or other profiles to make the work smoother. The method is as follows:

A user-interactive computer method for developing a parameterized operational rayset for shaping a geometric model, comprising the following steps:

(a) providing an initial rayset entry menu including user stipulation of at least one of entry of rayset from library, entry of rayset by defaults, and entry of rayset by user, to provide a rayset of n rays that determines a structuring geometric shape;

(b) providing a parameters stipulation menu including user stipulation of at least one of entry of parameters by defaults, and entry of parameters by user, to provide parameters for said operational rayset of at least one of scale, balance, convexity/concavity (CMODE), degree of faceting and memory limitation;

(c) combining the operational rayset and the parameters, resulting in a parameterized operational rayset;

(d) providing a demonstration stipulation menu including user stipulation of at least one of selection of a demonstration geometric model by defaults and selection of a demonstration geometric model by the user;

(e) applying to the demonstration geometric model a translational sweep corresponding to the first ray of said parameterized operational rayset, resulting in a sweptspace;

(f) iteratively applying to the sweptspace of the respectively preceding sweep a translational sweep corresponding to the next ray of said parameterized operational rayset, until a sweep corresponding to ray n has been applied, resulting in a final sweptspace which is the demonstration geometric model shaped in accordance with the currently developed parameterized operational rayset;

(g) displaying the shaped demonstration geometric model for user acceptance;

(h) providing an acceptance stipulation menu including user stipulation of at least one of forwarding the developed parameterized operational rayset to a utilization device, and continuing rayset development by return to a previous step (a–e) for repeating menu steps with changes of user stipulations.

The user may prefer to use a default parameterized operational rayset from a library, if one is available, as a starting point. The user may also start from the beginning, but use the technique of selecting a zonotope and collapsing that zonotope to define the rayset. A cube, for example, collapses into three identical orthogonal rays. The ultimate finite steps in such a zonotope collapse would collapse to a point.

The user accept defaults or enters parameters of scale, balance, CMODE, degree of faceting and memory limitation. The user accepts a default or selects a demonstration geometric model from a series of simple objects of increasing dimensions, for example, point, line, rectangle, rectangular right prism. The user needs to configure the parameterized operational rayset to change the operation. To change rayset R (represented as a matrix whose columns are the ray vectors) into a new rayset, R', that has prescribed differences in its thickening effects, the procedure is as follows:

If the depths of the outward layers that R' is to grow upon planes that are perpendicular to one, two, or three of the directions given by three mutually orthogonal unit vectors, $U^1$, $U^2$, and $U^3$, (columns of any orthonormal matrix) are to be, respectively, $k_1$, $k_2$, and $k_3$ times the corresponding depths effected by rayset R, then R' may be formed from R by applying this rule (in which I denotes the identity matrix):

$$R' = \left(I - \sum_{i=1}^{3} (1 - k_i) U^i U^{iT}\right) R.$$

Remark: Taking K as the diagonal matrix having $k_i$ as ith diagonal entry, a briefer expression having the same value is $$R' = U K U^T R.$$

The former expression may be preferred because it shows explicitly how, for those $k_i$ having value 1, i.e. for those directions in which the thickening is the same, the corresponding $U^T$ vectors may be avoided. Shaping operations are costly in terms of computer time. It is a good investment to design the parameterized operational rayset in terms of the demonstration geometric model before going into operation shaping the actual geometric model. The demonstration geometric model is easier for the user to review, and usually saves computer time as contrasted to shaping the actual geometric model. The system is used to carry out a shaping operation on the demonstration geometric model, according to the parameterized operational rayset, and to display the resulting sweptspace in terms of the appropriate shaped demonstration geometric model. The user may review the operation as the rayset is produced, may step through a complete rayset and review the operation, or may review the complete rayset in terms of operation. The user may enter changes as the need becomes apparent. When the user is satisfied that the parameterized operational rayset is correct, the user then accepts it for use on the actual geometric object to be shaped. Colinear rays are combined automatically to ensure simplicity of rayset and minimum computer use.

The user may find it convenient to alter the sequence of steps in setting up the parameterized operational rayset.

While the invention has been shown and described in terms of a computer modelling system using a parameterized operational rayset to provide a controlled cumulative translational sweep to perform the desired shaping of the geometric model, with features for convenience and economy of use, it will be obvious to those skilled in the art that the foregoing and other changes in form and detail may be made without departing from the spirit and scope of the invention, as defined in the following claims.

What is claimed is:

1. A method for shaping a geometric model, comprising the following steps performed by a computer of:
    (a) providing for entry of a parameterized operational rayset of n rays, which rays determine a structuring geometric shape;
    (b) applying to the geometric model a translational sweep corresponding to a first ray of said parameterized operational rayset, resulting in a sweptspace for the sweep;
    (c) iteratively applying to the sweptspace of the respectively preceding sweep a translational sweep corresponding to a next ray of said parameterized operational rayset, until a sweep corresponding to ray n has been applied, resulting in a final sweptspace which is a desired shaped geometric model; and
    (d) providing the shaped geometric model to a utilization device.

2. A method for shaping a geometric model, comprising the following steps performed by a computer of:
    (a) providing for entry of an operational rayset of n rays, which rays determine a structuring geometric shape;
    (b) providing for entry of at least one of initializing parameters scale, balance, convexity/concavity (CMODE), degree of faceting, and memory limitation, for said operational rayset;
    (c) combining said operational rayset and said parameters, resulting in a parameterized operational rayset;
    (d) applying to the geometric model a translational sweep corresponding to a first ray of said parameterized operational rayset, resulting in a sweptspace for the sweep;
    (e) iteratively applying to the sweptspace of the respectively preceding sweep a translational sweep corresponding to a next ray of said parameterized operational rayset, until a sweep corresponding to ray n has been applied, resulting in a final sweptspace which is a desired shaped geometric model; and
    (f) providing the shaped geometric model to a utilization device.

3. A method for shaping a geometric model, according to claim 2, in which said providing for entry of initializing parameters includes providing for user entry of scaling values that control directional extent of swell (growth or shrinkage) of said operational rayset in independent directions.

4. A method for shaping a geometric model, according to claim 2, in which said providing for entry of initializing parameters provides for user entry of a balance parameter that determines relative positioning between an unshaped geometric model and the shaped geometric model corresponding to said operational rayset.

5. A method for shaping a geometric model, according to claim 2, in which said providing for entry of initializing parameters includes providing for user entry of a convexity/concavity (CMODE) that controls whether shaping produced by said operational rayset effects rounding or retains sharpness in regions of the geometric model which are locally convex or locally concave.

6. A method for shaping a geometric model, according to claim 2, in which said providing for entry of initializing parameters includes providing for user entry of parameters to control degree of faceting of the geometric model.

7. A method for shaping a geometric model, according to claim 2, in which at least one of said providing for entry steps comprises providing for entry of default values.

8. A method for shaping a geometric model according to claim 2, wherein said iteratively applying a translational sweep includes canvassing direction-of-face indicators to develop a sweep-direction-facecount along the direction of sweep and to develop a contra-sweep-facecount along a direction opposite the direction of sweep, comparing the sweep-direction-facecount and contra-sweep-facecount, selectively reversing the direction of sweep if the sweep-direction-facecount is greater than the contra-sweep-facecount, resulting in a congruent-but-translated sweptspace from a simpler procedure; and performing a translation operation to correct for the translated sweptspace.

9. A method for shaping a geometric model, according to claim 2, wherein said iteratively applying a translational sweep includes limited memory of the sweptspace of the respectively preceding sweep, and said providing for entry of initializing parameters includes providing for user entry of values for memory limitation.

10. A user-interactive computer method for developing a parameterized operational rayset for shaping a geometric model, comprising the following steps performed by a computer of:
 (a) providing an initial rayset entry menu including user stipulation of at least one of entry of rayset from library, entry of rayset by defaults, and entry of rayset by user, to provide a rayset of n rays that determines a structuring geometric shape;
 (b) providing a parameters stipulation menu including user stipulation of at least one of entry of parameters by default, and entry of parameters by user, to provide parameters of at least one of scale, balance, convexity/concavity (CMODE), degree of faceting and memory limitation for said operational rayset;
 (c) combining said operational rayset and said parameters, resulting in a parameterized operational rayset;
 (d) providing a demonstration stipulation menu including user stipulation of at least one of selection of a demonstration geometric model by defaults and selection of a demonstration geometric model by the user;
 (e) applying to said demonstration geometric model a translational sweep corresponding to a first ray of said parameterized operational rayset, resulting in a sweptspace for the sweep;
 (f) iteratively applying to the sweptspace of the respectively preceding sweep a translational sweep corresponding to a next ray of said parameterized operational rayset, until a sweep corresponding to ray n has been applied, resulting in a final sweptspace which is the demonstration geometric model shaped in accordance with a currently developed parameterized operational rayset;
 (g) displaying said shaped demonstration geometric model for user acceptance; and
 (h) providing an acceptance stipulation menu including user stipulation of at least one of forwarding the developed parameterized operational rayset to a utilization device, and of continuing rayset development by return to a previous step (a–e) for repeating menu steps with changes of user stipulations.

11. A method for developing a parameterized operational rayset for shaping a geometric model, according to claim 10, in which said providing an initial rayset entry menu includes user stipulations for selecting a structuring zonotope and collapsing said zonotope to provide defined rays.

12. A method for developing a parameterized operational rayset for shaping a geometric model, according to claim 10, in which said providing a parameters stipulation menu includes user stipulations for selection of a balance parameter.

13. A method for developing a parameterized operational rayset for shaping a geometric model, according to claim 10, in which said providing a parameters stipulation menu includes user stipulations for selection of scaling values that control directional extent of swell (growth or shrinkage) of said operational rayset in independent directions.

14. A method for developing a parameterized operational rayset for shaping a geometric model, according to claim 10, in which said providing a parameters stipulation menu includes user stipulations for selection of CMODE.

15. A method for developing a parameterized operational rayset for shaping a geometric model, according to claim 10, in which said providing a parameters stipulation menu includes user stipulations for selection of degree of faceting.

16. A method for developing a parameterized operational rayset for shaping a geometric model, according to claim 10, in which said providing a parameters stipulation menu includes user stipulations for selection of memory limitation.

17. A method for developing a parameterized operational rayset for shaping a geometric model according to claim 10, in which said providing a demonstration stipulation menu includes user stipulations for selection from a series of simple objects of increasing number of dimensions.

18. A method for developing a parameterized operational rayset for shaping a geometric model, according to claim 17, in which said providing a demonstration stipulation menu includes user stipulations for selection from a series of simple objects of increasing number of dimensions, including point, line segment, rectangle, and rectangular right prism.

19. A method for developing a parameterized operational rayset for shaping a geometric model, according to claim 10, in which said providing an initial rayset entry menu includes automatic combination of colinear rays.

* * * * *